United States Patent
Kaneko

(10) Patent No.: US 10,049,161 B2
(45) Date of Patent: Aug. 14, 2018

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tsuyoshi Kaneko, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 435 days.

(21) Appl. No.: 14/341,631

(22) Filed: Jul. 25, 2014

(65) Prior Publication Data
US 2015/0032731 A1 Jan. 29, 2015

(30) Foreign Application Priority Data

Jul. 29, 2013 (JP) .................. 2013-156716

(51) Int. Cl.
*G06F 7/00* (2006.01)
*G06F 17/30* (2006.01)

(52) U.S. Cl.
CPC .. *G06F 17/30864* (2013.01); *G06F 17/30424* (2013.01); *G06F 17/30893* (2013.01)

(58) Field of Classification Search
None
See application file for complete search history.

(56) References Cited

U.S. PATENT DOCUMENTS

| | | | | |
|---|---|---|---|---|
| 8,290,978 B2* | 10/2012 | Nishio | ............... | H04L 63/0815 707/706 |
| 2008/0134089 A1* | 6/2008 | Adachi | ................. | G06F 3/0481 715/810 |
| 2008/0147799 A1* | 6/2008 | Morris | ................... | H04L 51/18 709/206 |
| 2011/0078128 A1* | 3/2011 | Chunilal | .......... | G06F 17/30867 707/706 |
| 2012/0158846 A1* | 6/2012 | Linder | .................... | H04L 51/32 709/204 |
| 2013/0110832 A1* | 5/2013 | Wood | ............... | G06F 17/30203 707/736 |

(Continued)

FOREIGN PATENT DOCUMENTS

JP 2007-272602 A 10/2007
JP 2011-096251 A 5/2011

OTHER PUBLICATIONS

Wilkinson et al., "BioMOBY Successfully Integrates Distributed Heterogeneous Bioinformatics Web Services. The PlaNet Exemplar Case", Plant Physiology, vol. 138, pp. 5-17, May 2005, American Society of Plant Biologists.*

(Continued)

*Primary Examiner* — Uyen Le
(74) *Attorney, Agent, or Firm* — Canon USA, Inc. I.P. Division

(57) ABSTRACT

An information processing apparatus in which information pieces indicating a plurality of service providers that can provide specific services are registered in advance includes: a selection unit for selecting some of the plurality of information pieces displayed by a display unit in accordance with an instruction of a user, and an access unit. The information pieces selected by the selection unit include a plurality of information pieces which each indicate a service provider that can provide an individual specific service.

6 Claims, 28 Drawing Sheets

(56) References Cited

U.S. PATENT DOCUMENTS

2013/0110890 A1* 5/2013 Bailor ................. H04L 51/22
                                                      707/827
2014/0026067 A1* 1/2014 Park .................. G06F 17/3089
                                                      715/748

OTHER PUBLICATIONS

GB IPO Combined Search and Examination Report for Application No. GB1413300.3, dated Jan. 21, 2015.
Josh Soref, "Means for allowing triggering of all registered handlers" email—Josh Soref, Two (2) pages, Aug. 23, 2012.
Jean-Claude Dufourd, "Possibly additional requirement for web intents" email, Four (4) pages, Jul. 16, 2012.
Paul Kinlan, "Means for allowing triggering of all registered handlers" email—Paul Kinlan, Three (3) pages, Aug. 23, 2012.

* cited by examiner

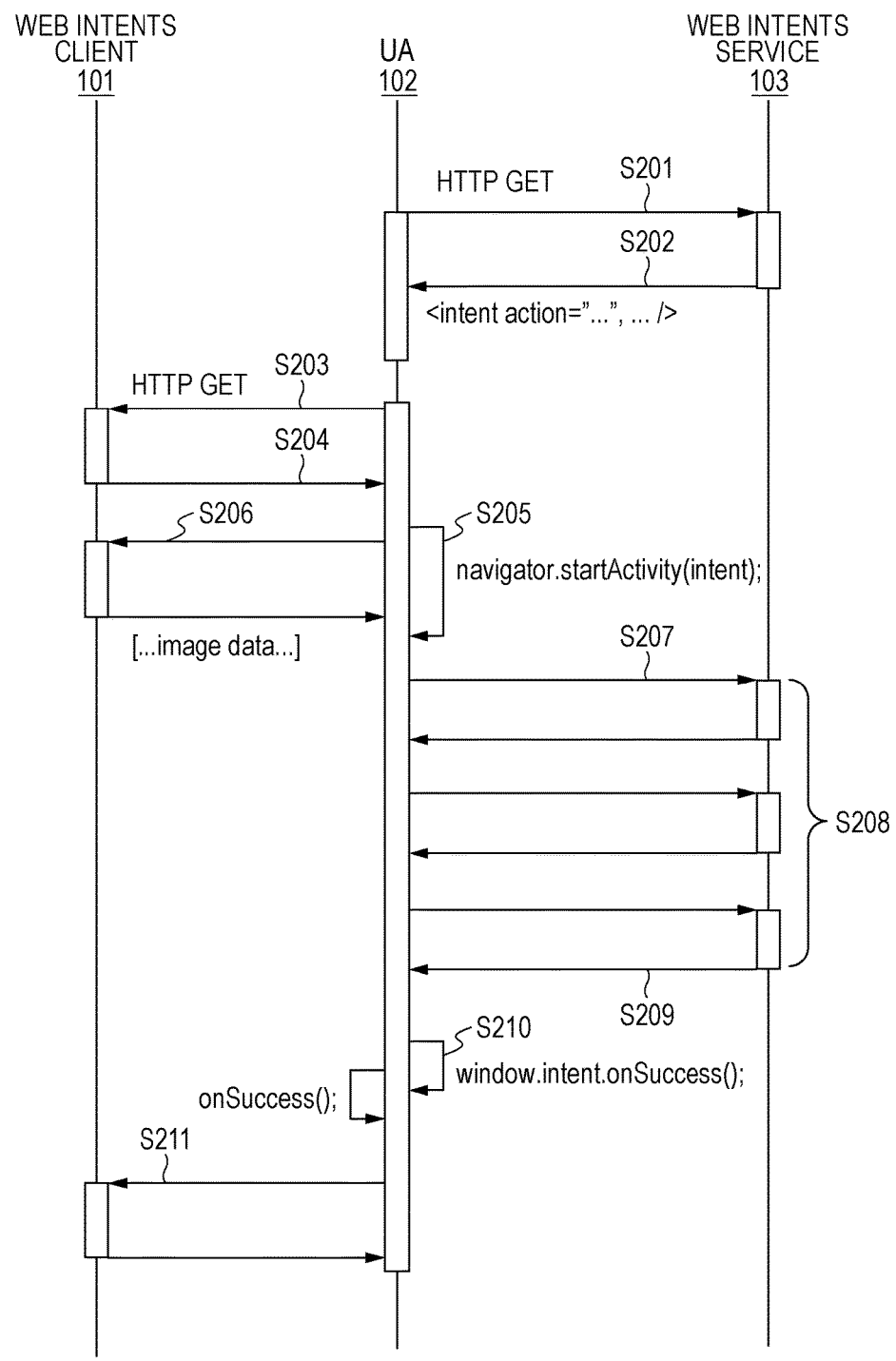

FIG. 3

```
<intent
  action="http://webintents.org/share"
  type="image/*"
  href="share.html"
  title="Share image using e-mail"
  disposition="window"
/>
```

FIG. 4

```
document.getElementById('share-photo').addEventListener(
  "click", function() {
    var intent = new Intent(
      {"action":"http://webintents.org/share",
       "type":"image/jpeg",
       "data":getImageFrom(...)});
    navigator.startActivity(intent, onSuccess);
}, false);
```

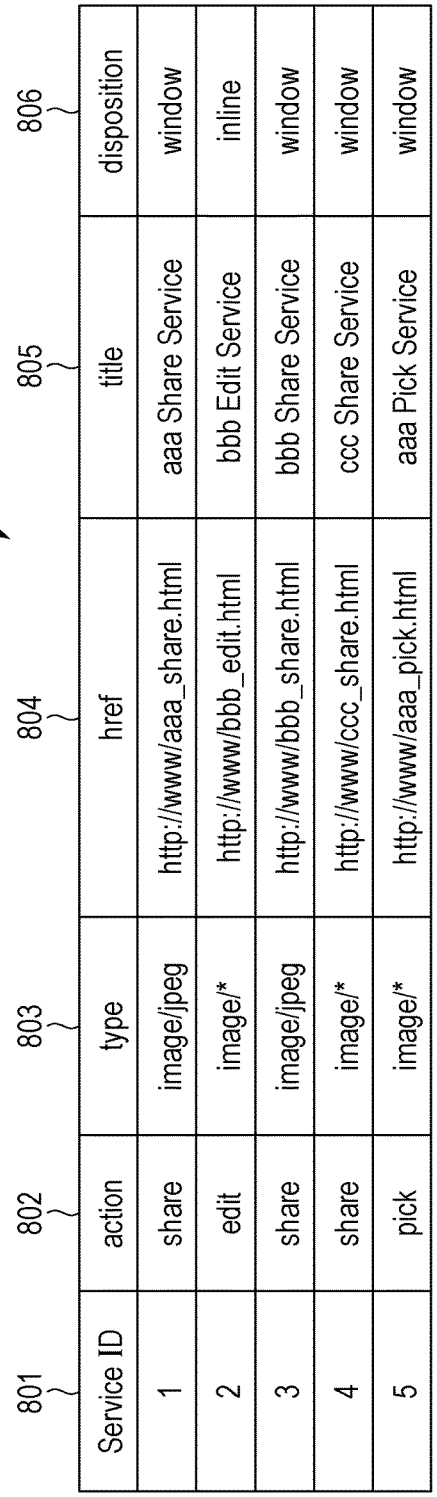

FIG. 8A

| Service ID | action | type | href | title | disposition |
|---|---|---|---|---|---|
| 1 | share | image/jpeg | http://www/aaa_share.html | aaa Share Service | window |
| 2 | edit | image/* | http://www/bbb_edit.html | bbb Edit Service | inline |
| 3 | share | image/jpeg | http://www/bbb_share.html | bbb Share Service | window |
| 4 | share | image/* | http://www/ccc_share.html | ccc Share Service | window |
| 5 | pick | image/* | http://www/aaa_pick.html | aaa Pick Service | window |

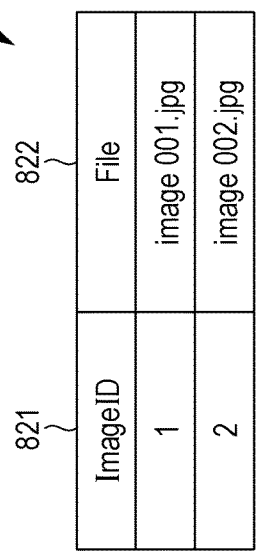

FIG. 8B

| ImageID | File |
|---|---|
| 1 | image 001.jpg |
| 2 | image 002.jpg |

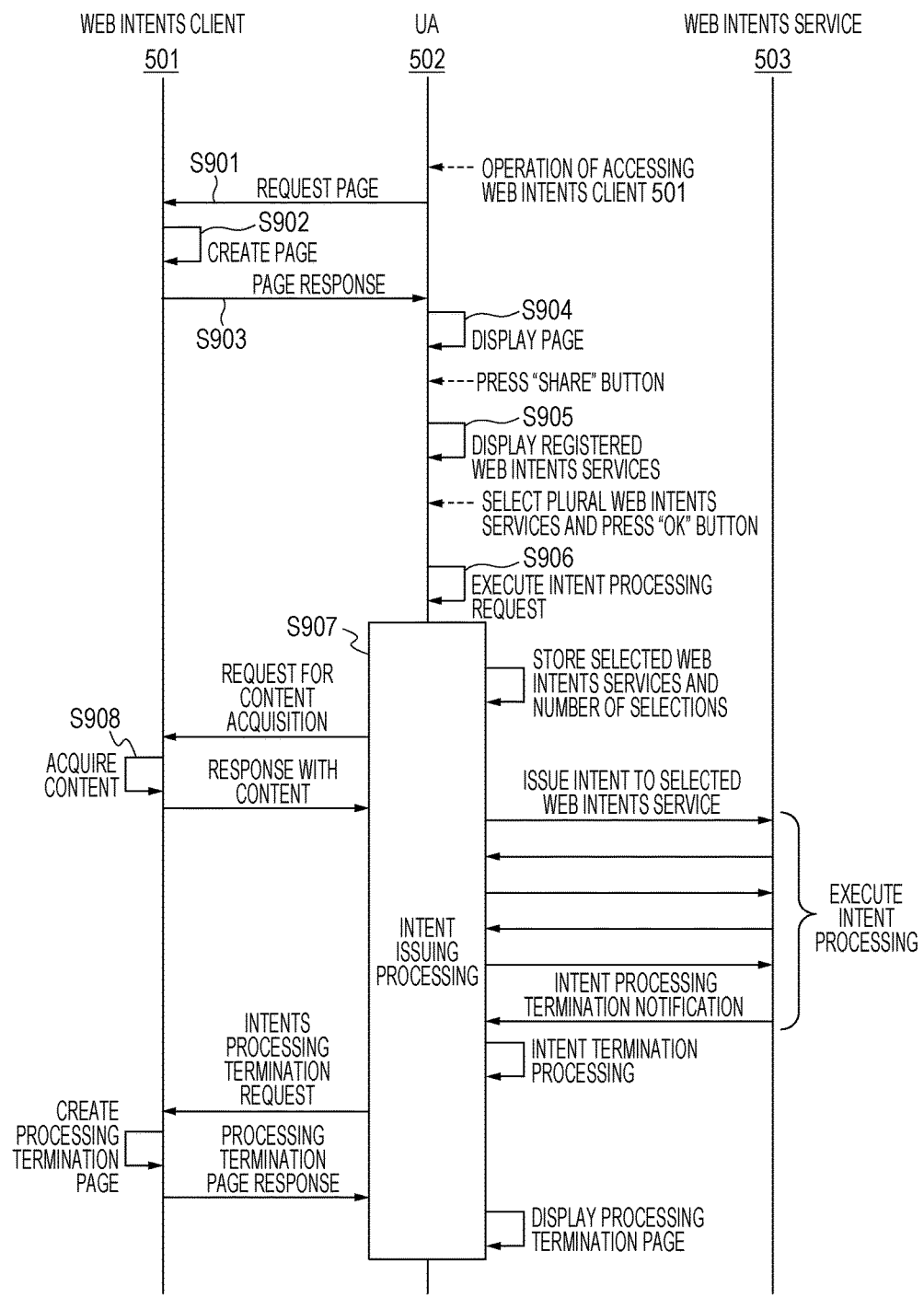

FIG. 10A
```
document.getElementById('share-photo').addEventListener(
"click", function() {
 var intent = new Intent(
{"action":"http://webintents.org/share",
    "type":"image/jpeg",
     "data":getImageFrom(...)
    }
   );
   navigator.startActivity(intent, onSuccess);
  }, false);

. . . . .

document.getElementById('edit-photo').addEventListener(
"click", function() {
 var intent = new Intent(
{"action":"http://webintents.org/edit",
    "type":"image/*",
     "data":getImageFrom(...)
    }
   );
   navigator.startActivity(intent, onSuccess);
  }, false);
```

FIG. 10B

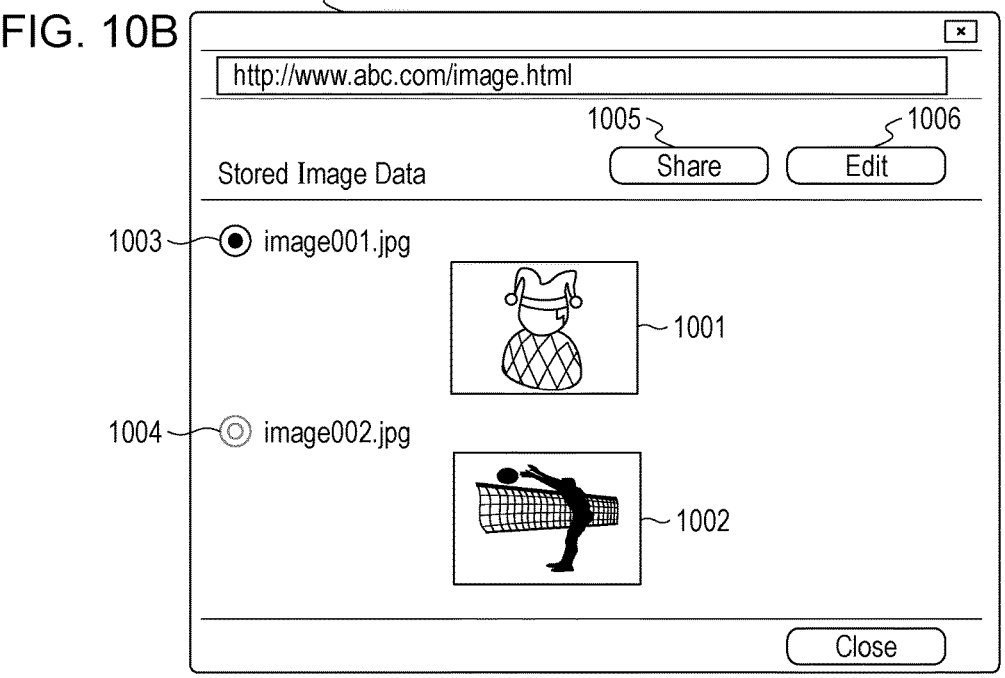

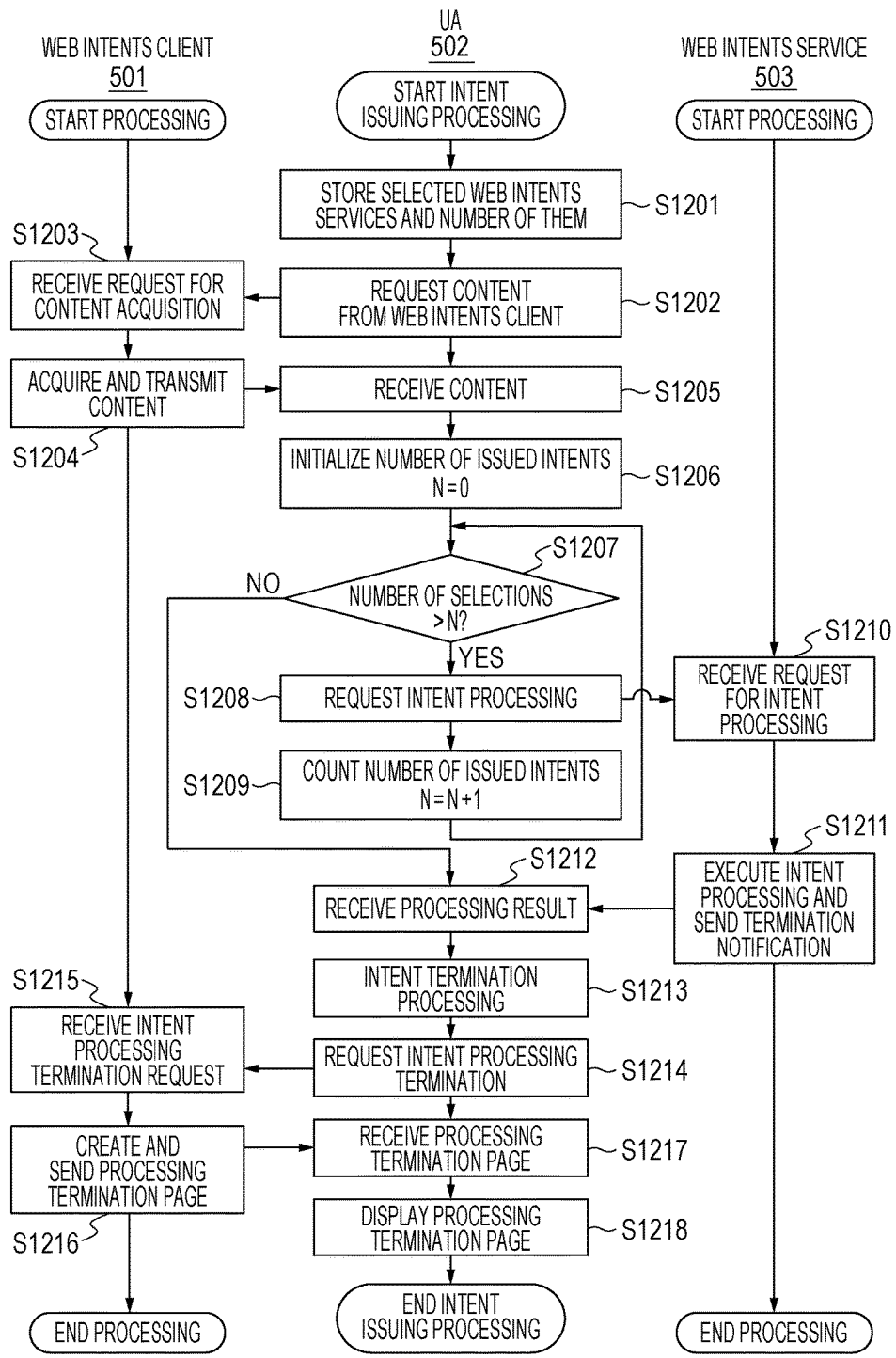

| 1701 | 1702 | 1703 | 1704 | 1705 | 1706 |
|---|---|---|---|---|---|
| Service ID | action | type | href | title | disposition |
| 1 | share | image/jpeg | http://www.aaa_share.html | aaa Share Service | window |
| 2 | edit | image/* | http://www.bbb_edit.html | bbb Edit Service | inline |
| 3 | call | Item/phone | tell:123456789 | aaa Call application | window |
| 4 | share | image/* | http://www.ccc_share.html | ccc Share Service | window |
| 5 | call | Item/phone | tell:012345678 | bbb Call application | window |

| 1721 | 1722 |
|---|---|
| action | display type |
| share | multiple |
| call | single |
| pick | single |

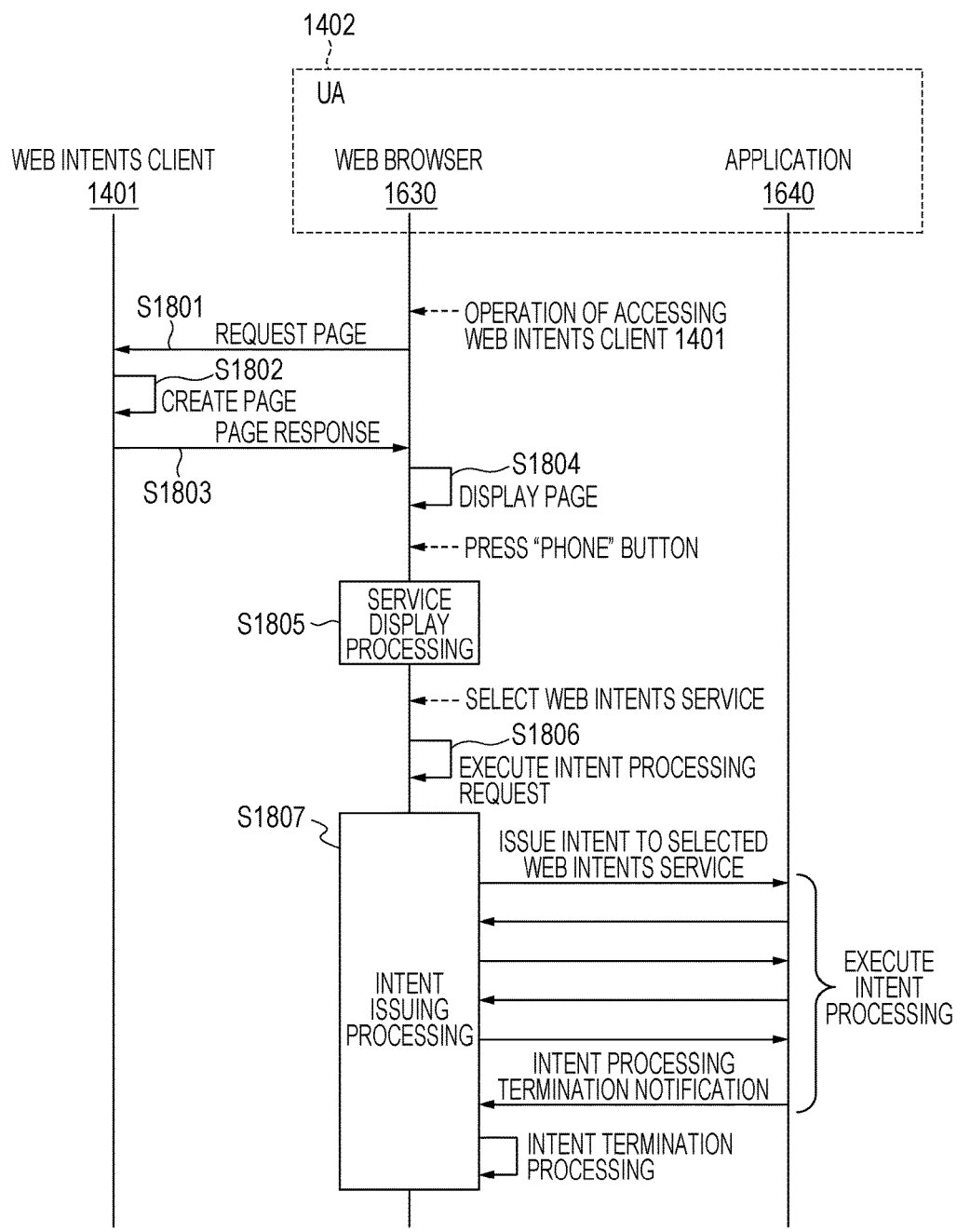

FIG. 19A
```
document.getElementById('call-phone').addEventListener(
  "click", function() {
    var intent = new Intent(
      {"action":"http://intents/call",
       "type":"Item/phone"
      }
    );
    navigator.startActivity(intent);
  }, false);
```
FIG. 19B
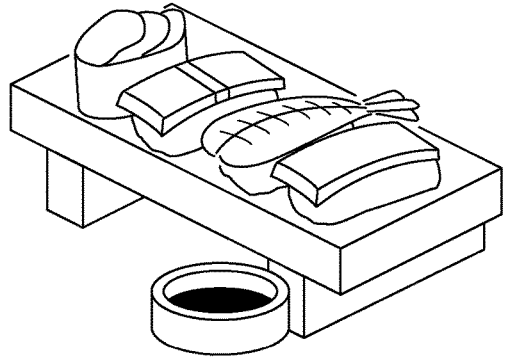
1900
http://www.abc.com/xxxxxxxx
Local sake & Local fish
"SUSHI-YA"
Three-minute walk from the North exit of ABC Station
Top   Menu   Picture
 Phone    Map
1901

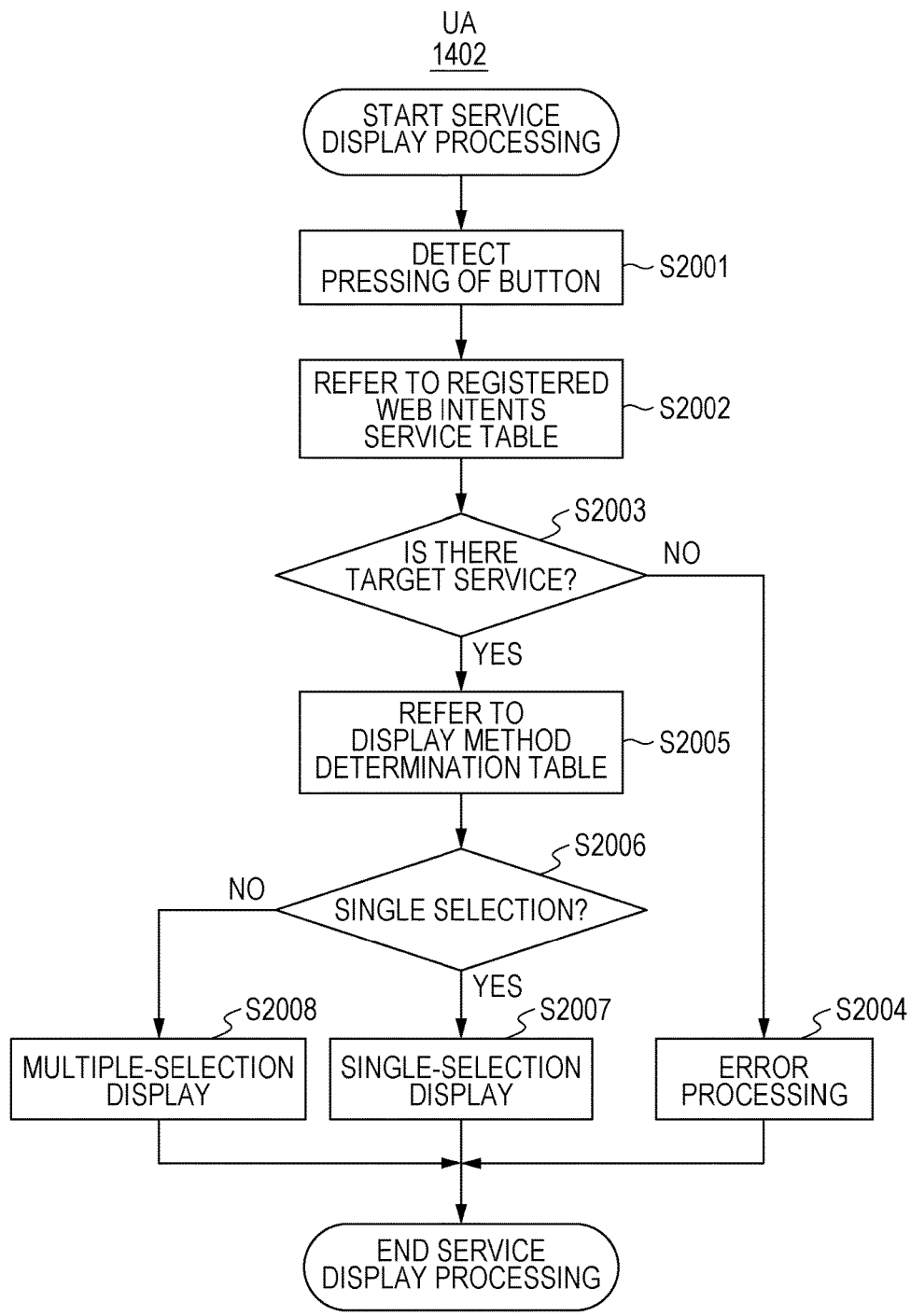

FIG. 25A 2500

| Service ID 2501 | action 2502 | type 2503 | href 2504 | title 2505 | disposition 2506 |
|---|---|---|---|---|---|
| 1 | share | image/jpeg | http://www/aaa_share.html | aaa Share Service | window |
| 2 | edit | image/* | http://www/bbb_edit.html | bbb Edit Service | inline |
| 3 | share | image/jpeg | http://www/bbb_share.html | bbb Share Service | window |
| 4 | share | image/* | http://www/ccc_share.html | ccc Share Service | window |
| 5 | pick | image/* | http://www/aaa_pick.html | aaa Pick Service | window |

FIG. 25B 2510

| action 2511 | exclusive flag 2512 |
|---|---|
| share | 0 |
| pick | 1 |

```
document.getElementById('menu').addEventListener(
  "click", function() {
    var intent_1 = new Intent(
      {"action":"http://intents/share",
       "type":"image/jpeg"
      }
    );
    var intent_2 = new Intent(
      {"action":"http://intents/pick",
       "type":"image/*"
      }
    );
    navigator.startActivity(intent_1, onSuccess);
    navigator.startActivity(intent_2, onSuccess);
  }, false);
```

INFORMATION PROCESSING APPARATUS, METHOD OF CONTROLLING THE SAME, AND STORAGE MEDIUM

BACKGROUND OF THE INVENTION

Field of the Invention

The present invention relates to a technique for providing a service using a mechanism such as Web Intents.

Description of the Related Art

Hitherto, when processing is transferred between web sites, it has been required that a caller of a function have knowledge about a method of calling the function, such as an application programming interface (API) or a REST interface on the function side. Hence, to realize cooperation with another web site, it has been required that the caller of the function conform to calling procedures of both sides.

On the other hand, there exists a mechanism for cooperating with any Web service (or web application) without using a dedicated API. As an example, a mechanism called Web Intents has been proposed.

Existing techniques include a technique disclosed in Japanese Patent Laid-Open No. 2007-272602. With this technique, when a user performs printing, a print driver makes a plurality of options be displayed, and controls the print settings in accordance with whether or not the selected print settings exceed the authorized settings. Japanese Patent Laid-Open No. 272602 is not related to cooperation between Web services utilizing the mechanism of Web Intents or the like.

SUMMARY OF THE INVENTION

An information processing apparatus in which information pieces indicating a plurality of service providers that can provide specific services are registered in advance includes: a display unit configured to display the plurality of information pieces registered in advance, a selection unit configured to select some of the plurality of information pieces displayed by the display unit in accordance with an instruction of a user, and an access unit configured to access service providers corresponding to the information pieces selected by the selection unit. The information pieces selected by the selection unit include a plurality of information pieces which each indicate a service provider that can provide an individual specific service.

Further features of the present invention will become apparent from the following description of exemplary embodiments with reference to the attached drawings.

BRIEF DESCRIPTION OF THE DRAWINGS

FIG. 2 is a sequence diagram illustrating the basic operation of Web Intents.

FIG. 3 illustrates an example markup for registration in a Web Intents service.

FIG. 4 illustrates an example of a request for Intent processing generated by an Intents client.

FIG. 8A illustrates a registered Web Intents service table in the first embodiment and FIG. 8B illustrates a content management table 820 for a Web Intents client and a Web Intents service in the first embodiment.

FIG. 9 is a sequence diagram at the time when a UA issues Intents in the first embodiment.

FIG. 10A illustrates ECMA Script code in an HTML document created by a Web Intents client in the first embodiment, and FIG. 10B illustrates an example of a screen of a Web Intents client displayed by a UA in the first embodiment.

FIG. 12 is a flowchart of processing in which a UA issues Intents in the first embodiment.

FIG. 17A illustrates a registered Web intents service table of a UA in the second embodiment, and FIG. 17B is a display method determination table of a UA in the second embodiment.

FIG. 18 is a sequence diagram at the time when a UA controls a display method in the second embodiment.

FIG. 19A illustrates ECMA Script code in an HTML document created by a Web Intents client in the second embodiment, and FIG. 19B illustrates an example of a screen of a Web Intents client displayed by a UA in the second embodiment.

FIG. 20 is a flowchart of display determination processing of a UA in the second embodiment.

FIG. 25A illustrates a registered Web Intents service table of a UA in the third embodiment, and FIG. 25B illustrates an exclusive action table of a UA in the third embodiment.

DESCRIPTION OF THE EMBODIMENTS

First Embodiment

Hereinafter, preferred embodiments of the present invention will be described with reference to the drawings.

Figure 1:
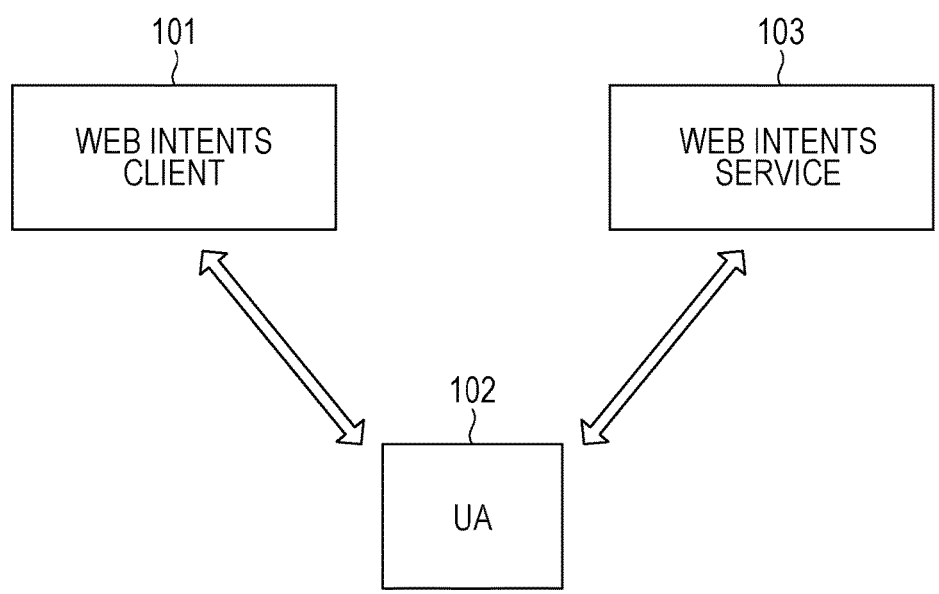
FIG. 1 is a diagram illustrating the whole configuration of Web Intents.

FIG. 1 is a diagram illustrating the whole configuration. Reference symbol 103 denotes a Web Intents service that provides a service or function using the Intents technique, reference symbol 101 denotes a Web Intents client utilizing the Web Intents service. Reference symbol 102 denotes a user agent (UA) that plays the roles of giving a request from the Web Intents client 101 to the Web Intents service 103 and giving a result received from the service to the Web Intents client 101. When social buttons, such as "like", "check", and "share" buttons in a Web Intents service SNS site are explained from the viewpoints of the mechanism of Web Intents, the Web Intents client 101 corresponds to a site where the buttons are arranged. The UA 102 is a web browser (hereinafter, called a browser), the Web Intents service 103 corresponds to a service to which a "like" message, for example, is posted. When user authentication or an operation performed by a user is necessary when the Web Intents service 103 provides functions, the user performs operations on the UA 102. Note that the Web Intents service 103 is realized by the server or server group of a service provider that provides Web Intents services.

Note that the UA 102 can be realized by an operating system (OS) or an application running on an information processing terminal if a function of cooperating with a service, described later, can be provided, not limited to a browser. Here, examples of the information terminals include a personal computer (PC), a smart phone, a tablet, and a car navigator.

There is no limitation to a service provider as long as the service provider is able to provide service on the Internet. For example, peripheral devices such as a printer, a scanner, and a network camera, or home appliances such as a refrigerator and a television, connected through a network, can be a service provider.

FIG. 2 is a sequence diagram for explaining the basic operation regarding provision of services using Web Intents. In step S201, the UA 102 accesses the Web Intents service 103 in accordance with a user operation. In step S202, the Web Intents service 103 sends back, to the UA 102, an HTML response including registration markup for asking the UA 102 to register a service to be provided.

The content of the response sent to the UA 102 as a reply from the Web Intents service 103 will be described using the example of FIG. 3. Information for identifying a service is described in the <intent> tag. "action" indicates what function (what kind of service) is provided by the present service, "type" indicates what can be handled in that "action". "href" indicates a URL of the service, "title" indicates the title of the service. "disposition" indicates how the service is displayed. In this example, the formats of an object which can be processed by the Web Intents service 103 are all formats, and this shows that image data of any format can be "shared". The destination of connection at this time is "share.html", the title is "share image using e-mail", and display will be performed in a separate window.

Upon receipt of this response, the UA 102 asks the user whether or not the Web Intents service is to be registered in the UA 102. For example, when the UA 102 is a browser, a pop up window is displayed and the user is asked to make a selection. When the user selects registration of the Web Intents, the UA 102 stores this inside thereof.

In step S203, the UA 102 accesses the Web Intents client 101 in accordance with a user operation. In step S204, the Web Intents client 101 replies to the UA 102 with an HTML response stating that the Web Intents service 103 is used. For example, when there is an image and a "share" button in a certain web site, the site sends back an HTML message including ECMA Script code illustrated in FIG. 4 to the UA 102.

The content of the HTML response sent by the Web Intents client 101 to the UA 102 will be described with reference to the example of FIG. 4. The ECMA Script code shows that when a button with an ID "share-photo" within the HTML code is clicked, a specified anonymous function will be executed. The anonymous function first creates a new Intent object and calls a startActivity ( ) function with this object as an argument. Upon execution of this function, the UA 102 extracts content whose action and type match specified ones from among the Web Intents services 103 registered in the UA 102, and displays the list of them, thereby making the user make a selection. Further, by executing a getImageFrom ( ) function, called within the anonymous function, the UA 102 acquires image data possessed by the Web Intents client 101.

In step S205, the UA 102 receives the HTML response, and displays it. When the "share" button on the screen is pressed by the user in step S206, the ECMA Script code for Web Intents activation is executed as described above, and the image data possessed by the Web Intents client 101 is acquired. Upon pressing of the "share" button, a list of the Web Intents services 103 registered in the UA 102 is displayed. When a Web Intents service 103 is selected from the list of the Web Intents services 103 by the user, the UA 102 transmits a request to the selected Web Intents service 103 in step S207. At this time, the UA 102 makes the content of the Intent object created by the ECMA Script code illustrated in FIG. 4 be included in the transmission data. In step S208, the Web Intents service 103 takes out the Intent object from the request and realizes the utilization of the selected service (here, "sharing" of an image) through interaction with the user. For example, when a user visits a site having images and a share button, and presses the share button, a list of services is displayed in a pop-up window. Assuming that a Web mail service is selected, a new mail with an image data attached thereto is created and the user can transmit the electronic mail.

In step S209, when the processing is finished, the Web Intents service 103 sends back a response including ECMA Script code to the UA 102 to tell the Web Intent client 101 about the processing result. In step S210, the UA 102 executes the ECMA Script code included in the response and calls a call-back function, onSuccess ( ), specified by the argument of the startActivity ( ) function of step S205. In step S211, the UA 102 sends the processing result to the Web Intent client 101 using the call-back function, onSuccess ( ).

As a result of the processing described above, the Web Intent client 101, through the UA 102, can call the function of Web Intents and a service (in this example, "sharing of an image") provided by the Web Intents service 103.

Figure 5:
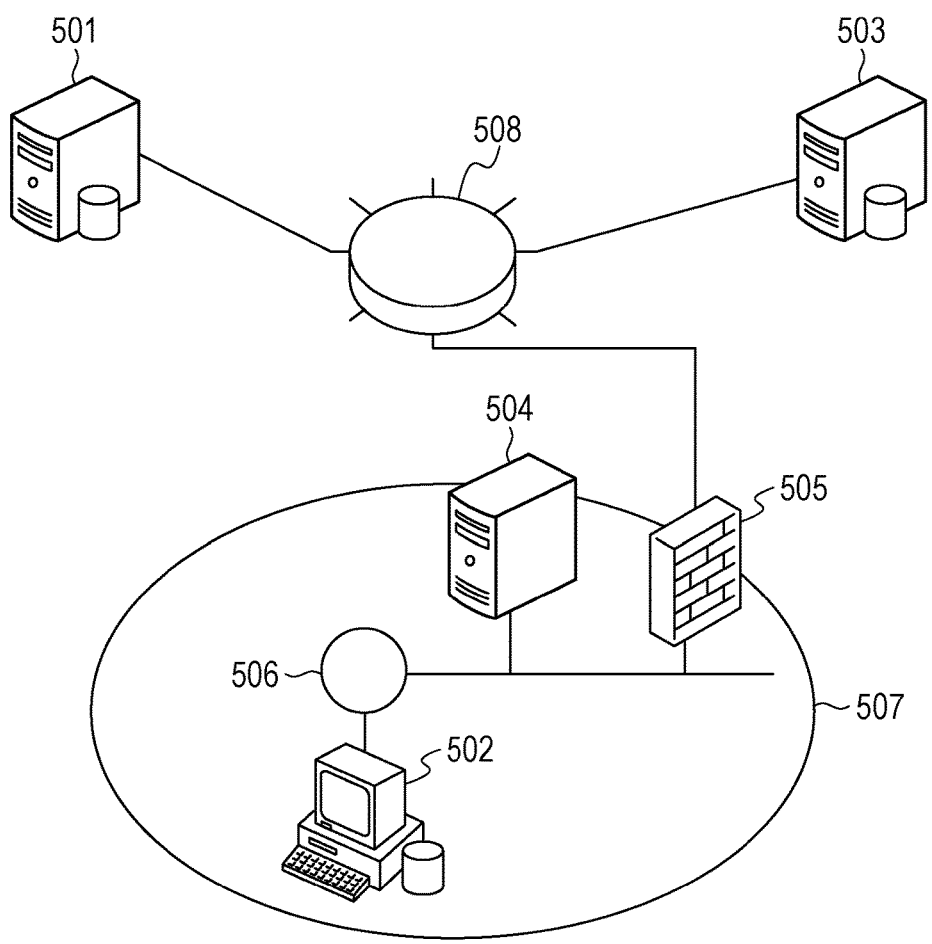
FIG. 5 is a system configuration diagram in a first embodiment.

FIG. 5 is a diagram illustrating a relationship among a Web Intents client, a UA, and a Web Intents service connected through the Internet.

In this figure, a unit denoted by 501 corresponds to the Web Intents client 101 described above and, here, is a Web Intents client representing a general web site providing a storage function such as storage of image data. A unit denoted by 502 corresponds to the UA 102 described above and, here, is a UA representing a web browser on a PC. A unit denoted by 503 corresponds to the Web Intents service 103 described above and, here, is a Web Intents service representing a web site (web application) providing functions and services of editing and storing an image, and posting the image to an SNS. A unit denoted by 504 is a proxy server, a unit denoted by 505 represents a firewall installed to enhance the security of an intranet, and a unit denoted by 506 represents a LAN. These units are mutually connected through the LAN 506. An area denoted by 507 represents an intranet environment where the UA 502, the proxy server 504, the firewall 505 are connected to one another through the LAN 506. Actually, a plurality of intranet environments 507, the Web Intents client 501, and the Web Intents service 503 are connected to one another through the Internet 508.

Note that in the present embodiment, the Web Intents client 501, the UA 502, the Web Intents service 503 each have the configuration of a computer. In the present embodiment, the communication protocol is assumed to be the HTTP protocol, the HTTPS protocol, or the like, but not specifically limited. For example, in the example of FIG. 5, the Web Intents client 501 and the Web Intents service 503 transmit and receive data to and from the UA 502 through the proxy server 504 and the firewall 505, using HTTPS.

Figure 6:
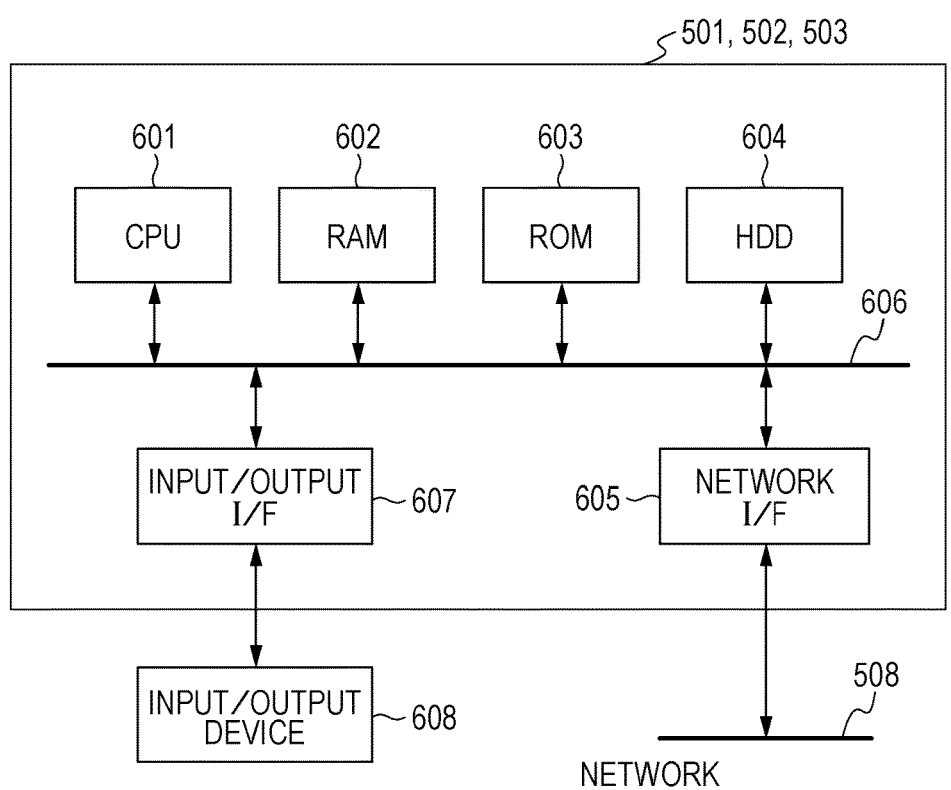
FIG. 6 is a hardware configuration diagram of a Web Intents client, a user agent (UA), and a Web Intents service in the first embodiment.

FIG. 6 is a diagram illustrating the hardware configuration of the Web Intents client 501, the UA 502, and the Web Intents service 503 according to an embodiment of the present invention.

The Web Intents client 501, the UA 502, and the Web Intents service 503 each include a CPU 601 that executes a program stored in a ROM 603 and performs overall control of the devices through an internal bus 606. A RAM 602, a ROM 603, an HDD 604, a network I/F 605, and an input/output I/F 607 are connected to the internal bus 606.

The input/output I/F 607 is constituted by, for example, a PS2 I/F, a Universal Serial Bus interface (USB I/F), and analog and digital display interfaces. An input/output device 608 such as a key board, a mouse, a CRT, and a liquid crystal display, and can be connected to a management server 106 through the input/output I/F 607.

Figure 7A:
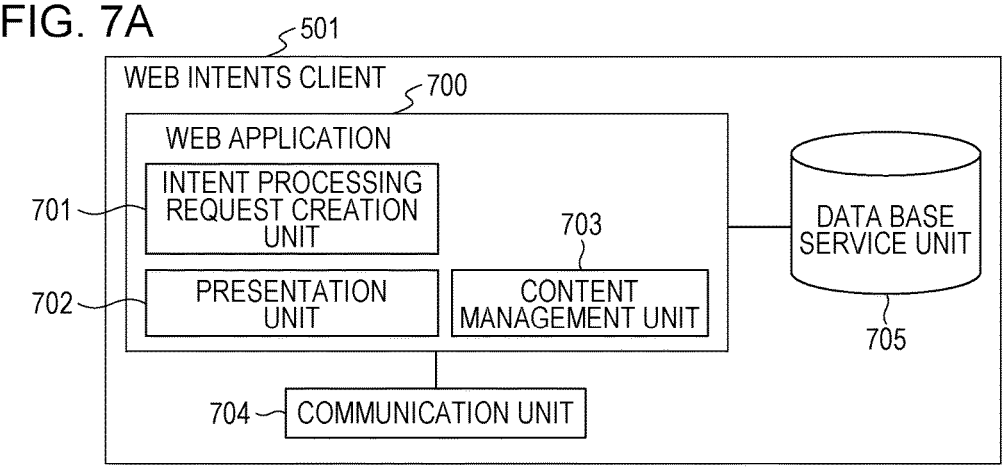
FIG. 7A is a software configuration diagram of a Web Intents client in the first embodiment.

FIG. 7A is a diagram illustrating an example of the software (processing units) configuration of the Web Intents client 501. In the Web Intents client 501, a web application 700 and processing units exist as files stored in the HDD 604 of the Web Intents client 501. These are program modules loaded at execution time in the RAM 602 and executed by other processing units that use the OS and the processing units. For example, the web application 700 is an application that provides a storage function of storing content such as image data. The web application 700 is implemented as a program that performs processing in response to a Hyper Text Transfer Protocol (HTTP) request. The web application 700 comprises an Intent processing request creation unit 701, a presentation unit 702, and a content management unit 703. The Intent processing request creation unit 701 is a software module for creating ECMA Script code, which is an Intent processing request. The presentation unit 702 is a software module that creates an HTML document in accordance with a page acquisition request or the like received through a communication unit 704. The content management unit 703 is a software module that acquires content from and stores content in the HDD 604 using a database service unit 705, in response to a request from the presentation unit 702. The database service unit 705 is a software module that stores content in and reads content from the HDD 604, in response to a request from other processing units. Note that the database service unit 705 may be located in an apparatus different from the Web Intents client 501.

Figure 7B:
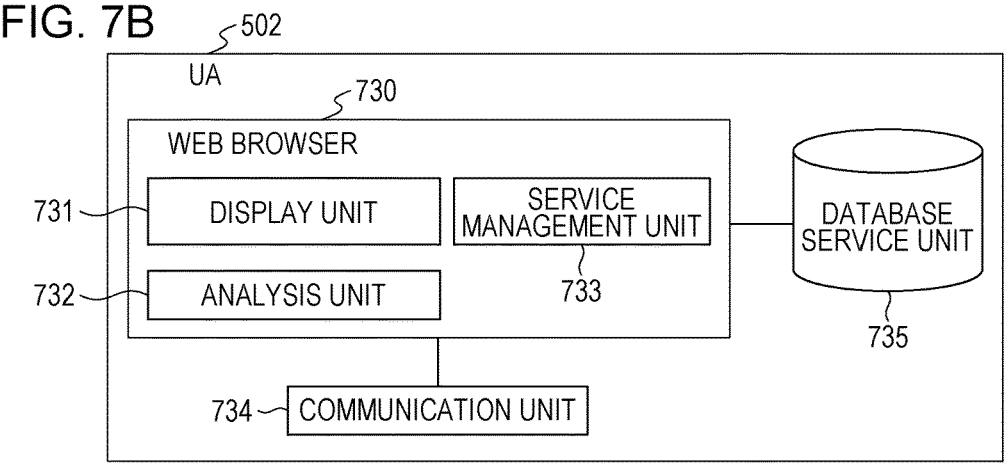
FIG. 7B is a software configuration diagram of a UA in the first embodiment.

FIG. 7B is a diagram illustrating an example of the configuration of the software (processing units) of the UA 502. In the UA 502, a web browser 730 and the processing units exist as files stored in the HDD 604 of the UA 502. These are program modules that are loaded in the RAM 602 and executed by the OS. The web browser 730 includes a display unit 731, an analysis unit 732, and a service management unit 733. The display unit 731 is a software module that renders an HTML document. The display unit 731 also displays a screen for asking a user to select a Web Intents service, in response to a request from the service unit 733. An analysis unit 732 is a software module that analyzes an HTML document. The analysis unit 732 also analyzes ECMA Script code which is an Intent processing request. The service management unit 733 is a software module that acquires an already registered Web Intents service from and stores a Web Intents service in the HDD 604 via a database service unit 735.

Figure 7C:
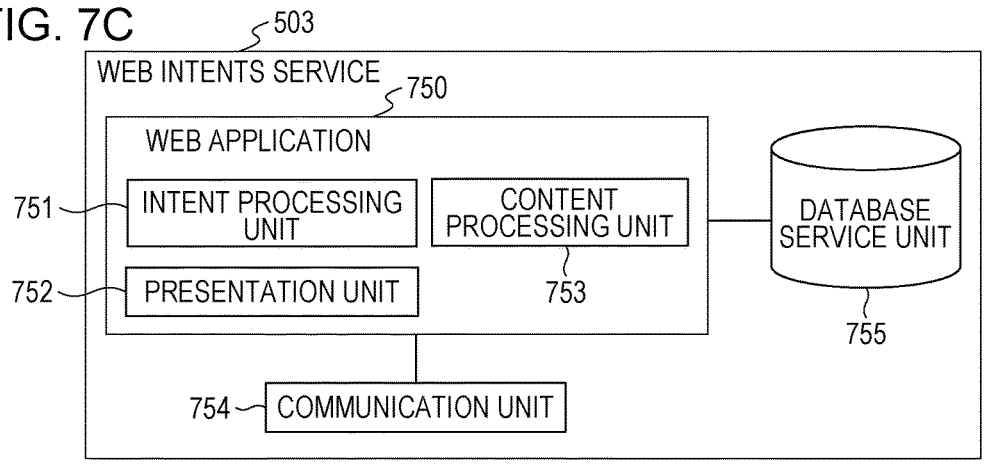
FIG. 7C is a software configuration diagram of a Web Intents service in the first embodiment.

FIG. 7C is a diagram illustrating the configuration of software (processing units) of the Web Intents service 503. In the Web Intents service 503, a web application 750 and the processing units exist as files stored in the HDD 604 of the Web Intents service 503. These are program modules loaded at execution time in the RAM 602 and executed by other processing units that use the OS and the above processing units. The web application 750 is an application that provides a storage function of storing content such as image data and a function of editing content. The web application 750 is implemented as a program that performs processing in response to an HTTP request. The web application 750 is constituted by an Intent processing unit 751, a presentation unit 752 and a content processing unit 753. The Intent processing unit 751 is a software module that analyzes an Intent object and instructs other processing units to perform processing in response to a request from the UA 502. The presentation unit 752 is a software module that creates an HTML document in response to a page acquisition request or the like received through a communication unit 754. The content processing unit 753 processes content upon receipt of an instruction from the Intent processing unit 751. For example, the content processing unit 753 is a software module that edits image data or stores content in the HDD 604 via a database service unit 755 in response to a request. The database service unit 755 is a software module that stores and reads data, in response to a request from other processing units. The database service unit 755 may be located in an apparatus different from the Web Intents service 503.

FIG. 8A illustrates an example of a registered Web Intents service table which is held by the UA 502 to manage Web Intents services registered in the UA 502 itself. This table is stored in the HDD 604 within the UA 502, and is controlled by the database service unit 735. Reference symbol 801 denotes "Service ID" which is an ID for uniquely identifying a Web Intents service in the web browser 730. Reference symbol 802 denotes "action", which indicates what kinds of function and service are provided by the Web Intents service 503. Reference symbol 803 denotes "type", which indicates what kinds of data format can be used for the action 802. Reference symbol 804 denotes "href", which indicates a relative URL of the Web Intents service 503. Reference symbol 805 denotes "title", which indicates the title of the Web Intents service 503. Reference symbol 806 denotes "disposition", which indicates how the Web Intents service 503 is displayed. In other words, with reference to the table via the web browser 730, the UA 502 can issue a request for processing of an Intent to the Web Intents service 503.

FIG. 8B is a content management table for managing image data handled by the web applications 700 and 750 of the Web Intents client 501 and the Web Intents service 503. This table is stored in the HDD 604 within the Web Intents client 501 and the Web Intents service 503, and is controlled by the database service unit 735. Reference symbol 821 denotes "Image ID", which indicates an ID for uniquely identifying image data within the web application 700. Reference symbol 822 denotes "File", which indicates the file name of image data. In other words, the Web Intents client 501 and the Web Intents service 503 can acquire image data from the HDD 604 and edit the image data with reference to this table, using the content management unit 703 and the content processing unit 753.

FIG. 9 is a sequence diagram at the time when the UA 502 accesses the Web Intents client 501 and issues a request for processing of Intents to the Web Intents service 503. Here, processing performed when the UA 502 accessed the Web Intents client 501 in a state in which the Web Intents service 503 has already been registered in the UA 502 will be described. Here, a plurality of Web Intents services are represented by the Web Intents service 503, as a matter of convenience.

In step S901, in accordance with a user operation, the web browser 730 of the UA 502 sends a request for a page, as an HTTP request message, to the Web Intents client 501 through a communication unit 734. In step S902, the web application 700 of the Web Intents client 501 creates a page. In step S903, the web application 700 of the Web Intents client 501 responds to the UA 502 with the page created in step S902 as an HTTP response message. In step S904, the display unit 731 of the web browser 730 of the UA 502 displays the received page. Specifically, the analysis unit 732 receives an HTML document via the communication unit 734 and analyzes it, and the display unit 731 performs rendering.

Here, an example of a screen displayed in step S904 will be described, using FIGS. 10A and 10B. FIG. 10A is an example of ECMA Script code which is created by the Web Intents client 501 in step S902 and described in the HTML document displayed by the UA 502 in step S904. Since the content is similar to the one described in FIG. 4, the detailed description will be omitted. FIG. 10B is an example of the screen displayed by the UA 502 in step S904. A screen 1000 is displayed by the display unit 731 of the web browser 730. Reference symbols 1001 and 1002 denote image data blocks of "image001.jpg" and "image002.jpg". Reference symbols 1003 and 1004 denote radio buttons for selecting these images. Reference symbol 1005 denotes a button for sharing image data selected by the radio button in the Web Intents service 503. Reference symbol 1006 denotes a button for delivering the image data selected by the radio button to the Web Intents service 503 and editing it. Here, it is assumed that an ID "share-photo" in the HTML code is assigned to a button 1005, and an ID "edit-photo" is assigned to the button 1006. Upon detection of the pressing of the buttons 1005 and 1006, the web browser 730 executes the ECMA Script code illustrated in FIG. 10A.

Figure 11A:
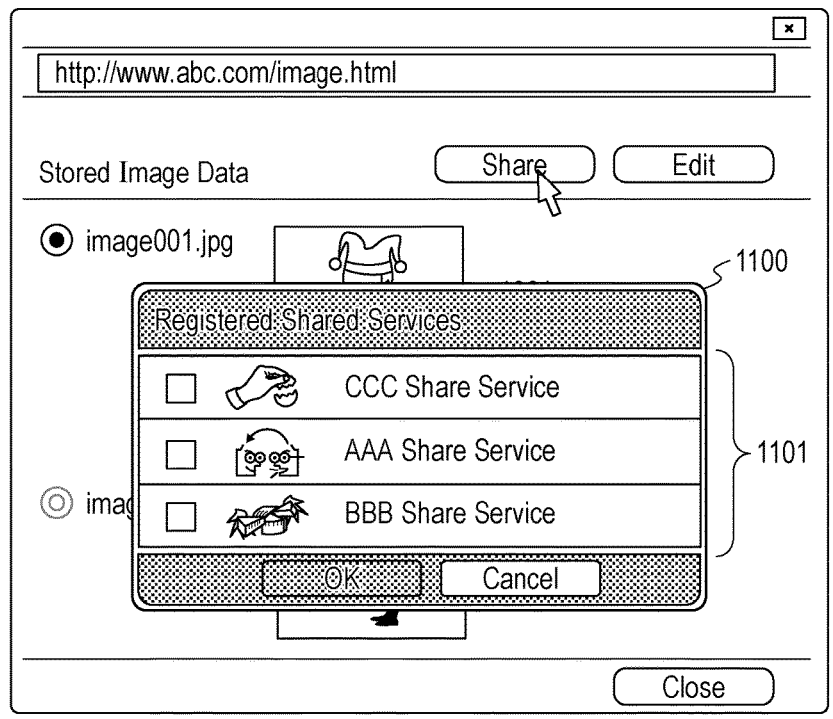
FIG. 11A illustrates an example of a screen at the time when a share button has been pressed in a UA.

When a "share" button 1005 is pressed by a user in the screen displayed in step S904, the UA 502 refers to a registered Web Intents service table 800 in step S905, and makes the web browser 730 display the Web Intents services 503, which became the targets to be displayed. Here, since the case in which the "share" button 1005 is being pressed is assumed, items in which the "action" 802 is "share" and the "Service IDs" 801 are 1, 3, and 4 become the target Web Intents services 503. FIG. 11A illustrates an example of a screen displayed in the web browser 730 by the UA 502 at this time. Reference symbol 1100 denotes a pop-up screen displayed by the UA 502, when the "share" button 1005 is pressed. Reference symbol 1101 denotes a list of the Web Intents services 503 which became the targets to be displayed in step S905.

Figure 11B:
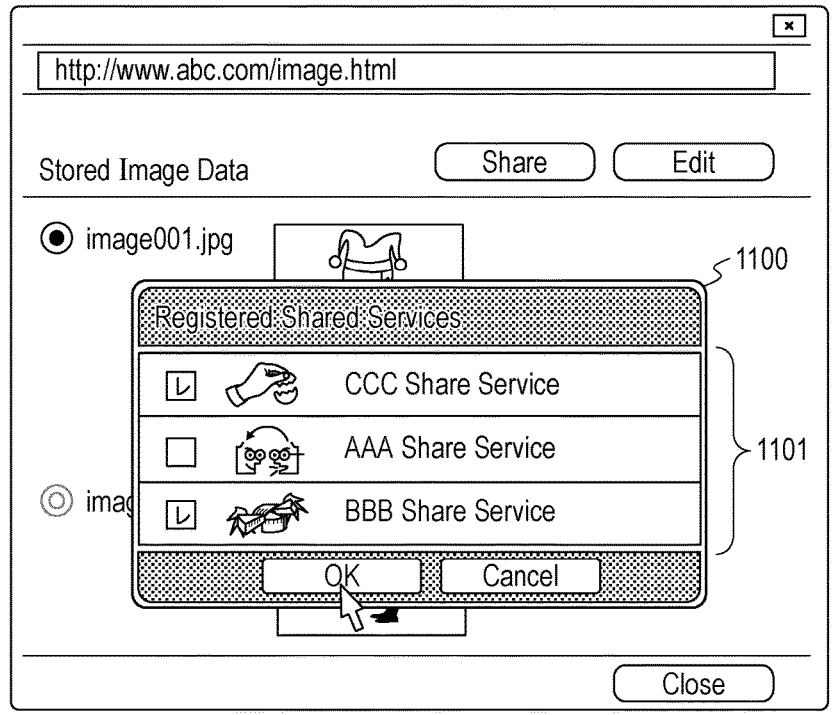
FIG. 11B illustrates an example of a screen at the time when a plurality of Intents services have been selected in a UA.

In the screen displayed in step S905, when a plurality of the Web Intents services 503 are selected and the "OK" button is pressed by a user, in step S906, the analysis unit 732 of the web browser 730 analyzes ECMA Script code and starts to execute it. Note that in the selection of the plurality of the Web Intents services 503, some or all of the displayed Web Intents services 503 may be selected. In step S907, the UA 502 starts Intent issuing processing. FIG. 11B illustrates a state in which a plurality of the Web Intents services 503 have been selected by the user.

The Intents issuing processing performed in step S907 will be described with reference to a flowchart illustrated in FIG. 12 corresponding to the issuing processing. FIG. 12 is a flowchart illustrating the Intent issuing processing performed by the UA 502 together with processing related to the Web Intents client 501 and the Web Intents service 503. In step S1201, the UA 502 stores the Web Intents services 503 selected by a user and the number of the selections in the RAM 602. In step S1202, the analysis unit 732 of the web browser 730 transmits a content acquisition request, as an HTTP request message, to the Web Intents client 501 via the communication unit 734. Note that this is realized by executing a getImageFrom ( ) function called from the anonymous function in the ECMA Script code illustrated in FIG. 10A. Here, since the radio button 1003 has been selected in the screen 1000, a request for acquisition of image001.jpg is issued. In the present embodiment, although the acquisition request is sent to the Web Intents client 501, image data in the HTML document acquired by the web browser 730 of the UA 502 in Step S903 may be used. In step S1203, the Web Intents client 501 receives the content acquisition request from the UA 502. In step S1204, the content management unit 703 of the Web Intents client 501 acquires requested image data from a content management table 820 of the HDD 604 using the database service unit 705. For example, when the file name of the image data specified by the content acquisition request is image001.jpg, an item whose Image ID 821 is "1", in the content management table 820, is the target data. The presentation unit 702 of the Web Intents client 501 transmits the image data acquired in step S908 via the communication unit 704 to the UA 502 as an HTTP response message. In step S1205, the UA 502 receives the content transmitted from the Web Intents client 501. In step S1206, the UA 502 initializes the number (N) of issued Intents. In step S1207, the UA 502 compares the number (N) of issued Intents with the number of selections stored in the RAM 602 in step S1201. When it is determined that the number of selections is larger than N, as a result of the comparison performed in step S1207, the UA 502 sends a request for Intent processing to the Web Intents service 503 in step S1208. At this time, the web browser 730 of the UA 502 makes the content of the Intent object created by the ECMA Script code of FIG. 10A be included in the transmission data. In step S1209, the UA 502 adds "1" to "N". Then, the number of selections is again compared with the number (N) of issued Intents, in step s1207. Processing of step S1207 to S1209 is repeated until the number of selections becomes larger than the number (N) of issued Intents. In this manner, requests for Intent processing for all the Web Intents services 503 selected by the user are processed.

Figure 13:
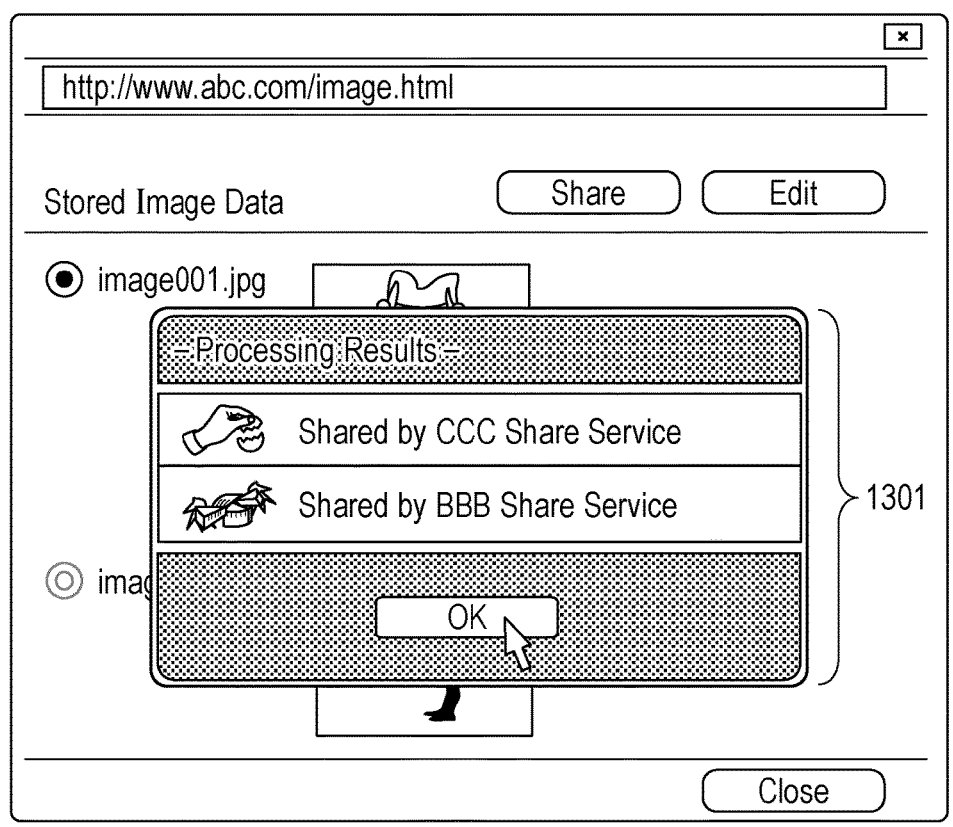
FIG. 13 illustrates an example of a screen of an Intents processing termination page displayed by a UA in the first embodiment.

In step S1210, the Web Intents services 503 receive requests for Intent processing from the UA 502. In step S1211, the Intent processing unit 751 of the web application 750 of each of the Web Intents services 503 takes out an Intent object from the request received in step s1210, analyzes it, and starts Intent processing. In the present embodiment, the web application 750 of the Web Intents service 503, while interacting with a user via the web browser 730 of the UA 502, performs processing for "sharing" image data 1001 included in an Intent object. Interaction with a user means the following. The web application 750 of the Web Intents service 503 creates an HTML document for receiving an operation of inputting the file name of image data and an operation of storing the image data, and transmits it to the UA 502. The web browser 730 of the UA 502 receives the HTML document and displays it on a screen, and upon detection of a storing operation performed by a user, transmits a request for storing the image data to the Web Intents service 503. The web application 750 of the Web Intents service 503, upon receipt of the request for storing the image data, stores the image data in the HDD 604 via the database service unit 755, using the content processing unit 753. At the same time, registration in the content management table illustrated in FIG. 8B is performed. The web application 750 of the Web Intents service 503, upon termination of the Intent processing, transmits to the UA 502 a processing termination notification including ECMA Script code for notifying the Web Intents client 501 of the processing result. In step S1212, the UA 502 receives the processing termination notification from the Web Intents service 503. In step S1213, the web browser 730 of the UA 502 executes the ECMA Script code included in the processing termination notification, and performs Intent termination processing by calling a call-back function specified by the argument of the startActivity ( ) function in step S906. For example, in the case of the ECMA Script code illustrated in FIG. 10A, a call back function onSuccess ( ) is executed. In step S1214, the web browser 730 of the UA 502 transmits an Intent processing termination request to the Web Intents service 503. More specifically, this means that the processing result of the Web Intents service 503 is returned to the web application 700 of the Web Intents client 501 using the call-back function. In step S1215, the Web Intents client 501 receives the Intent processing termination request sent from the UA 502. In step S1216, the presentation unit 702 of the Web Intents client 501 creates a processing termination page for notification of the termination of the Intent processing using an HTML document and transmits it to the UA 502 via the communication unit 704. In step S1217, the UA 502 receives the HTML document of the processing termination page transmitted from the Web Intents client 501. In step S1218, the web browser 730 of the UA 502 displays the processing termination page received in step S1217. FIG. 13 is a diagram illustrating an example of the processing termination result, and reference symbol 1301 denotes the processing results of the respective Web Intents services 503.

In the present embodiment, a mechanism has been described in which the UA 502 provides a plurality of the Web Intents services 503 to the Web Intents client 501. As a result of the processing described above, a user can use a plurality of the Web Intents services 503 at the same time via the UA 502. Further, in the present embodiment, a case has been described in which the Web Intents services 503 corresponding to the action 802 defined by the Web Intents client 501 are retrieved, and as a result of the retrieval, the UA 502 displays all the corresponding Web Intents services 503. However, by making the Web Intents client 501 define an attribute other than the action 802, the display of the UA 502 can be controlled. For example, when an attribute indicating "secure" is defined for content, on the Web Intents client 501 side, the UA 502 can display only local services, without displaying the Web Intents services 503 accessed through the Internet. The local services refer to the Web Intents services 503 existing in the UA 502.

In the present embodiment, the configurations of the servers and devices, the configurations of the software modules, and the processing flow of using a plurality of services at the same time have been described. However, these are examples, and the present embodiment is not limited to these.

Further, in the present embodiment, the Web Intents client 501 has been described as a web site providing a storage function, and the Web Intents service 503 has been described as a web site providing a function of editing image data, storing it, or posting it to an SNS. However, the Web Intents service 503 can be applied to an image forming apparatus and a print service, such as managed print services (MPS).

Second Embodiment

In the first embodiment, description was made regarding a method of asking a plurality of services to perform processing at the same time as a result of a UA allowing a user to select a plurality of Web Intents services. In a second embodiment, a method will be described in which a UA determines whether or not a multiple-selection system will be employed in accordance with an "action" of a Web Intents service.

Figure 14:
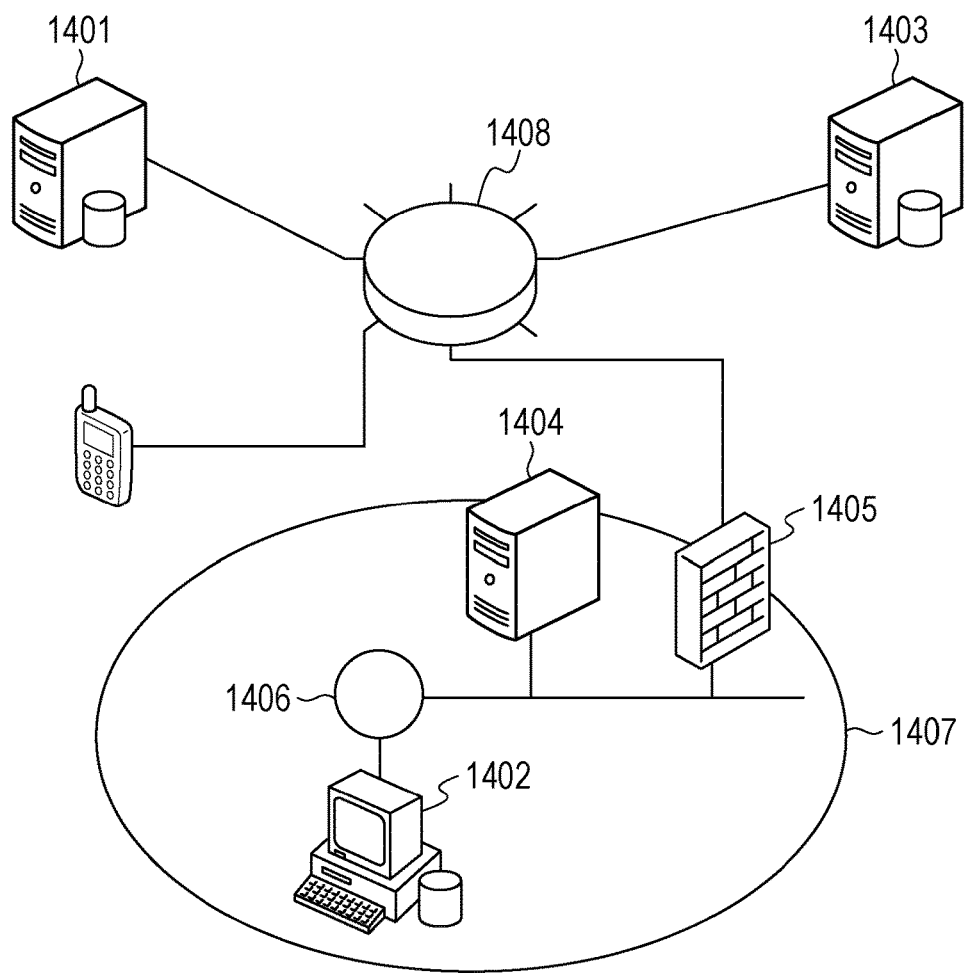
FIG. 14 is a system configuration diagram in a second embodiment.

FIG. 14 is a diagram illustrating a relationship among a Web Intents client, a UA, and a Web Intents service connected through the Internet, according to an embodiment of the present invention. A Web Intents client 1401, a UA 1402, and a Web Intents service 1403 are respectively the same as the Web Intents client 501, the UA 502, and the Web Intents service 503 described in the first embodiment. Further, a proxy server 1404, a firewall 1405, a LAN 1406, an intranet environment 1407, and the Internet 1408 are also the same as those described in the first embodiment. Hence, the descriptions thereof will be omitted here. In the present embodiment, the UA 1402 will described as a mobile terminal. The UA 1402 corresponds to a smart phone, a tablet, or the like, and a small-terminal OS and programs controlling voice communication and data communication are running on the UA 1402. The Web Intents services, which have referred to web sites (web applications) or the like thus far, are assumed to exist also in the UA 1402 in the present embodiment. For example, local applications (a communication application, an SNS application, a storage application, and a mailing application) installed in a mobile terminal correspond to these Web Intents services.

Figure 15:
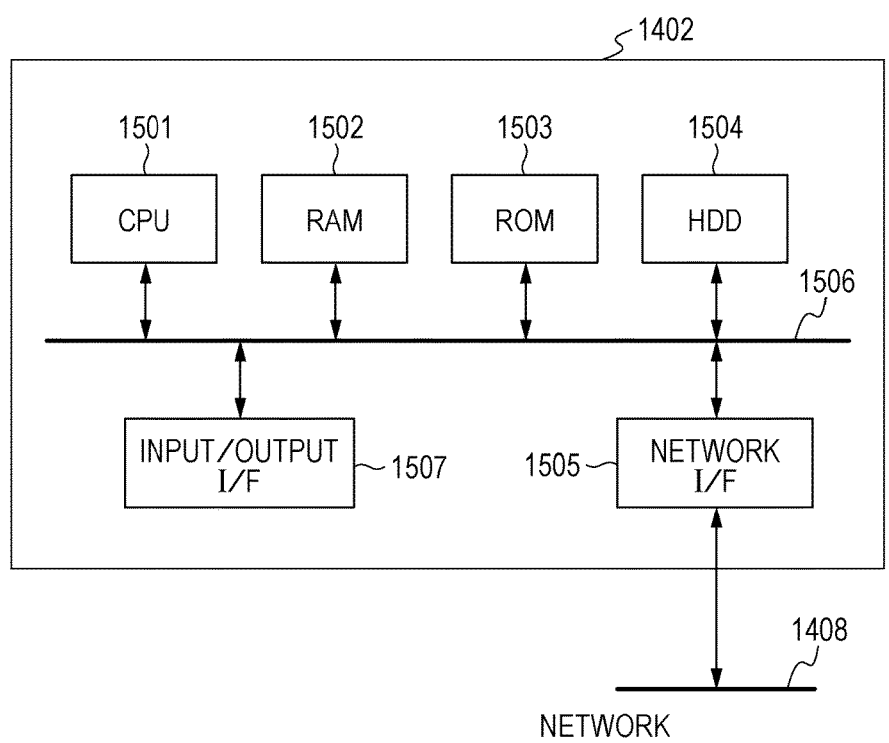
FIG. 15 is a hardware configuration diagram of a UA in the second embodiment.

FIG. 15 is a diagram illustrating the hardware configuration of the UA 1402 according to an embodiment of the present invention. Since the hardware configurations of the Web Intents client 1401 and the Web Intents service 1403 are the same as those described in FIG. 6 of the first embodiment, the descriptions thereof are omitted here. A CPU 1501 that executes a program stored in a ROM 1503 is provided, and the CPU 1501 performs overall control of devices via an internal bus 1506. The CPU 1501, a RAM 1502, the ROM 1503, an HDD 1504, a network I/F 1505, and the internal bus 1506 are the same as those described in the first embodiment and, hence, the descriptions thereof are omitted. The CPU 1501, the RAM 1502, the ROM 1503, the HDD 1504, the network I/F 1505, and an input/output I/F 1507 are connected to the internal bus 1506. The input/output I/F 1507 is an interface for input/output of audio data and for control in response to an instruction from a user, using a microphone/loud speaker, a display, a touch panel, and the like. This allows a user to give instructions to the UA 1402 for voice control of the mobile terminal, making a phone call, activation of applications, and the like.

Figure 16:
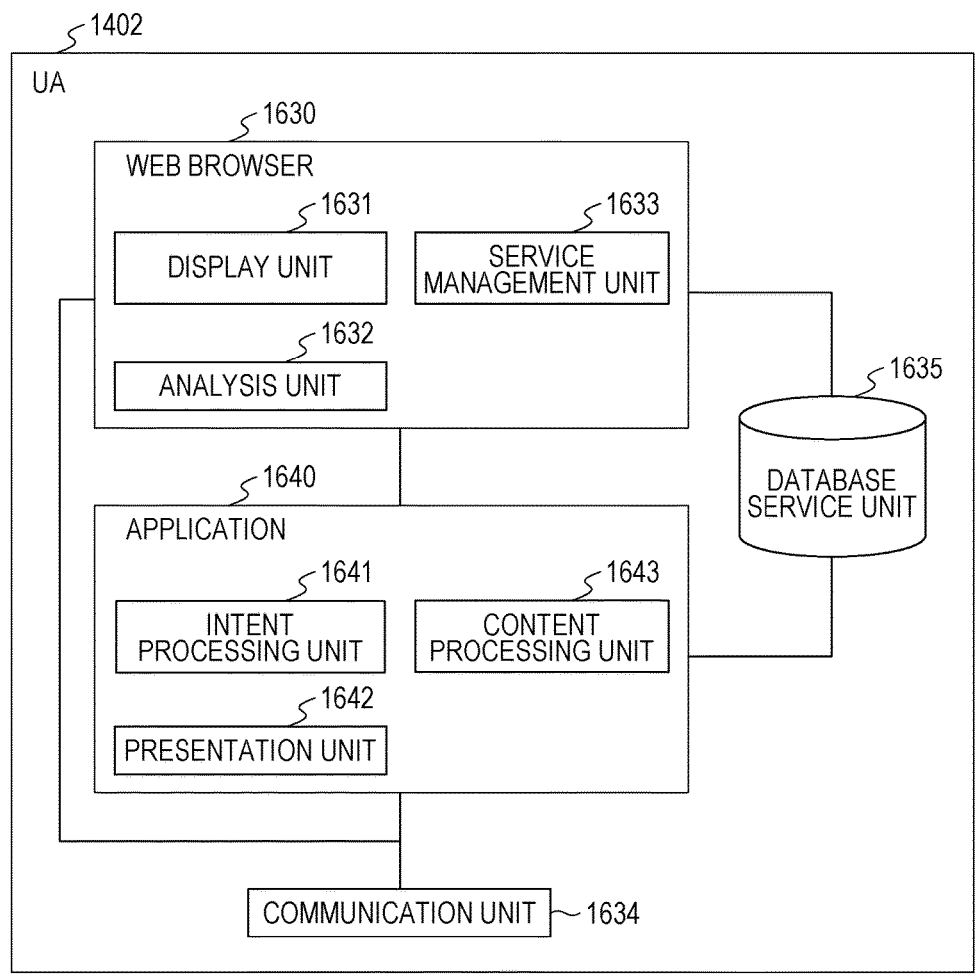
FIG. 16 is a software configuration diagram of a UA in the second embodiment.

FIG. 16 is a diagram illustrating an example of the software (processing units) configuration of the UA 1402. As described above, in the present embodiment, Web Intents services exist within the UA 1402 and, hence, a web browser 1630 (comprising a display unit 1631, an analysis unit 1632 and a service management unit 1633) and an application 1640 (comprising an intent processing unit 1641, a presentation unit 1642 and a content processing unit 1643) exist within the UA 1402. Since these are respectively the same as the web browser 730 and the web application 750 illustrated in FIGS. 7B and 7c, the descriptions of processing units will be omitted.

FIG. 17A is an example of a registered-Intents-service table held by the UA 1402 to manage Web Intents services registered in the UA 1402. This table is stored in the HDD 1504 within the UA 1402 and controlled by a database service unit 1635. A Service ID 1701, an action 1702, a type 1703, an href 1704, a title 1705, and a disposition 1706 are the same as those described in the first embodiment and, hence, the descriptions thereof will be omitted.

FIG. 17B illustrates an example of a display method determination table held by the UA 1402 to determine how information is to be displayed in a browser 1630 for each action. This table is stored in the HDD 1504 within the UA 1402 and controlled by the database service unit 1635. Reference symbol 1721 denotes an action, which is information indicating what function or service is provided by the Web Intents service 1403 (including the Web Intents service within the UA 1402). A reference symbol 1722 denotes a display type indicating how information is to be displayed by the UA 1402 in the browser 1630 for each action 1721. When the display type 1722 indicates "multiple", the UA 1402 performs displaying in such a manner as to make a plurality of Intents services be selected, as described in the first embodiment. When the display type 1722 indicates "single", the UA 1402 performs displaying in such a manner as to make one of a plurality of Intents services be selected. In other words, the display type 1722 makes it possible to determine whether or not a user is made to select a plurality of the Web Intents services 1403.

FIG. 18 is a sequence diagram illustrating processing in which the UA 1402 accesses the Web Intents client 1401 and changes the method of displaying the Web Intents service 1403 in accordance with the action 1721. Similarly to the first embodiment, here, processing performed when the UA 1402 accessed the Web Intents client 1401 in a state where the Web Intents services 1403 have already been registered in the UA 1402 will be described. Here, an example in which Intents are issued to Web Intents services within the UA 1402 will be described.

Processing of steps S1801 to S1804 is the same as that of steps S901 to S904 (FIG. 9) described in the first embodiment and, hence, the description thereof will be omitted. An example of a screen displayed in step S1804 will be described with reference to FIGS. 19A and 19B. FIG. 19A illustrates an example of ECMA Script code which is created by the Web Intents client 1401 in step S1802, and which is written in an HTML document displayed by the UA 1402 in step S1804. The ECMA Script code shows that when a button having an ID "call-phone" within the HTML document is clicked, a specified anonymous function is called. The anonymous function first creates a new Intent object and calls the startActivity ( ) function with this object as an argument. When this function is executed, the UA 1402 selects Web Intents services having a type identical to the type of the specified action of the Intents, from among the Web Intents services 1403 registered in the UA 1402, and displays them, thereby asking a user to make selection. FIG. 19B illustrates an example of a screen displayed by the UA 1402 in step S1804. A screen 1900 is displayed by a display unit 1631 of the browser 1630. Reference symbol 1901 denotes a button for calling the Web Intents service 1403 and making a phone call. Here, it is assumed that the ID "call-phone" in the HTML document is assigned to the button 1901. The browser 1630, upon detection of the pressing of the button 1901, executes the ECMA Script code illustrated in FIG. 19A. In the screen 1900 displayed in step S1804, when the "phone" button is pressed, the UA 1402 starts processing for displaying the target Web Intents service 1403 in step S1805.

The service display processing in step S1805 will be described with reference to a flowchart illustrated in FIG. 20.

Figure 21:
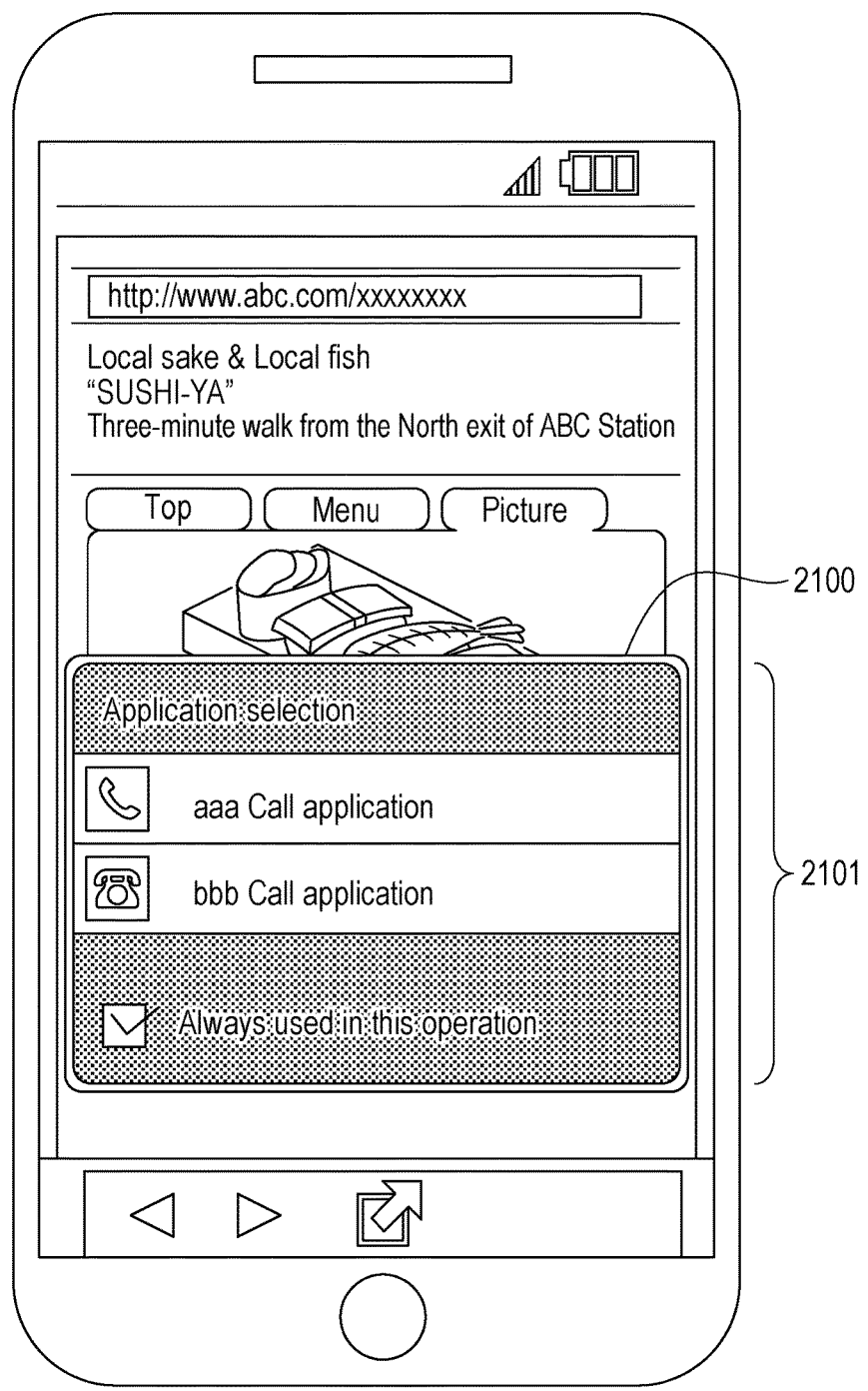
FIG. 21 illustrates an example of a screen of a UA at the time of a single selection method in the second embodiment.

FIG. 20 illustrates a flowchart of processing, performed by the UA 1402, for determining the method of displaying the Web Intents services 1403 with reference to an internal table. In step S2001, the UA 1402 detects that the "phone" button 1901 has been pressed by a user in the screen 1900. In step S2002, the UA 1402 refers to a registered Web Intents service table 1700. In step S2003, the UA 1402 determines whether or not a target service exists in the registered Web Intents service table 1700. When it is determined in step S2003 that the target service does not exist in the registered Web Intents service table 1700, the UA 1402 performs error processing in step S2004. The error processing is, for example, processing for displaying a message saying "The target applications or services are not found.", for example. When it is determined in step S2003 that the target service exists in the registered Web Intents service table 1700, the UA 1402 refers to a display method determination table 1720 in step S2005. Here, the Web Intents services 1403 whose Service IDs 1701 are 3 and 5 in which an action 1702 is "call" become the target Web Intents services 1403. In step S2006, the UA 1402 determines the method of displaying the object services. Here, in the display method determination table 1720, the display type 1722 is "single" for the entries whose action 1721 is "call" and, hence, single selection display is performed. When it is determined in step S2006 that the object service corresponds to single selection display, in step S2007, the browser 1630 of the UA 1402 displays the object service using a single selection method. FIG. 21 illustrates an example of a screen displayed by the browser 1630 of the UA 1402. Reference symbol 2100 denotes a pop-up screen displayed by the web browser 1630 of the UA 1402 at this time as a result of the "phone" button being pressed. Reference symbol 2101 denotes a list window listing the target Web Intents services 1403 to be displayed. When it is determined in step S2006 that the target services do not correspond to single selection display, the browser 1630 of the UA 1402 displays the target services using a multiple-selection method in step S2008 (refer to the pop-up screen 1100 in the first embodiment).

Subsequent to display processing for the Web Intents services 1403 performed in step S1805, a service is selected by a user from the list of the Web Intents services 1403. Steps S1806 and S1807 subsequent to the above-described steps are the same as steps S906 and S907 (FIG. 9) and, hence, the descriptions thereof will be omitted. In the case of the present embodiment, since the result of processing for the Web Intents service 1403 need not be returned to the Web Intents client 1401, the present use case ends at the time when Intent termination processing is completed in the Intent issuing step S1807.

In the present embodiment, a mechanism of how the display method at the time when the UA 1402 displays a list of the Web Intents services 1403 is changed by the action 1702 has been described. On the basis of the above-described processing, the UA 1402 can change the display method in the browser 1630 by means of the Web Intents service 1403. In the present embodiment, the configurations of the servers and devices, the configurations of the software modules, the processing flow of using a plurality of services at the same time have been described. However, these are only examples, and the present embodiment is not limited to these.

Third Embodiment

In the first embodiment, a method of asking a plurality of services to perform processing at the same time as a result of a UA allowing a user to select a plurality of Web Intents services was described. In a third embodiment, a method will be described in which a UA determines whether or not exclusive display will be employed in accordance with an "action" of a Web Intents service.

Figure 22:
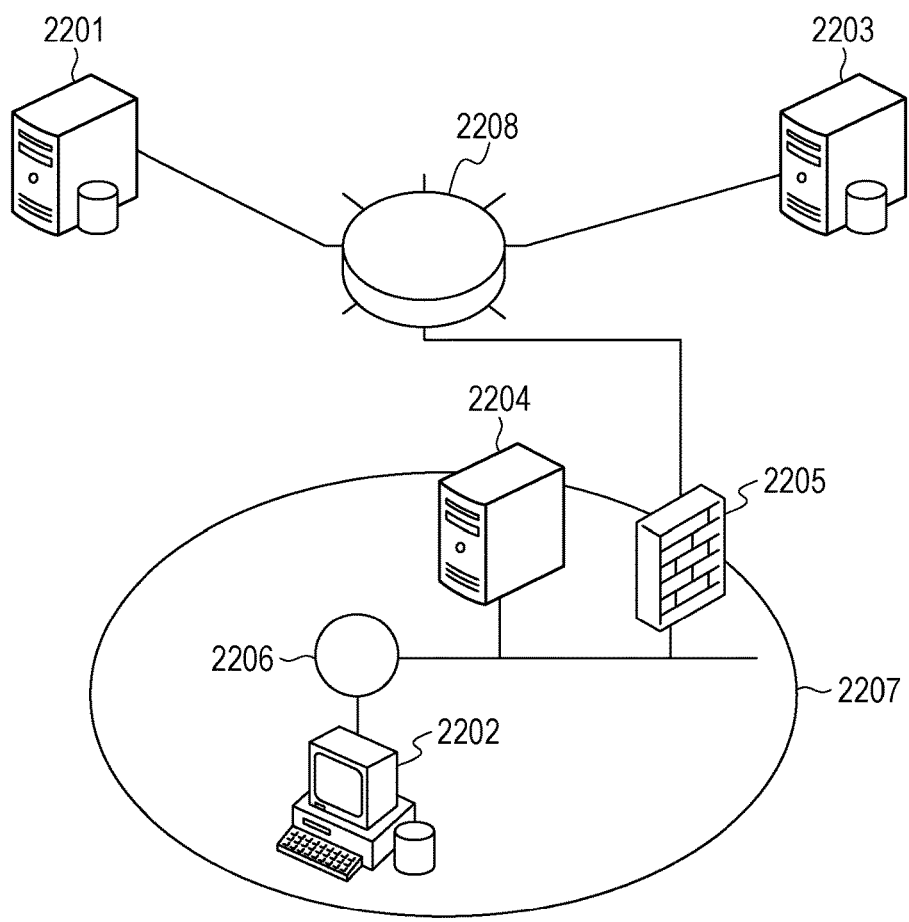
FIG. 22 is a system configuration diagram in a third embodiment.

FIG. 22 is a diagram illustrating a relationship among a Web Intents client, a UA, and a Web Intents service connected through the Internet. A Web Intents client 2201, a UA 2202, and a Web Intents service 2203 are respectively the same as the Web Intents client 501, the UA 502, and the Web Intents service 503 described in the first embodiment. Further, a proxy server 2204, a firewall 2205, a LAN 2206, an intranet environment 2207, and the Internet 2208 are also respectively the same as those described in the first embodiment. Hence, the descriptions thereof will be omitted here.

Figure 23:
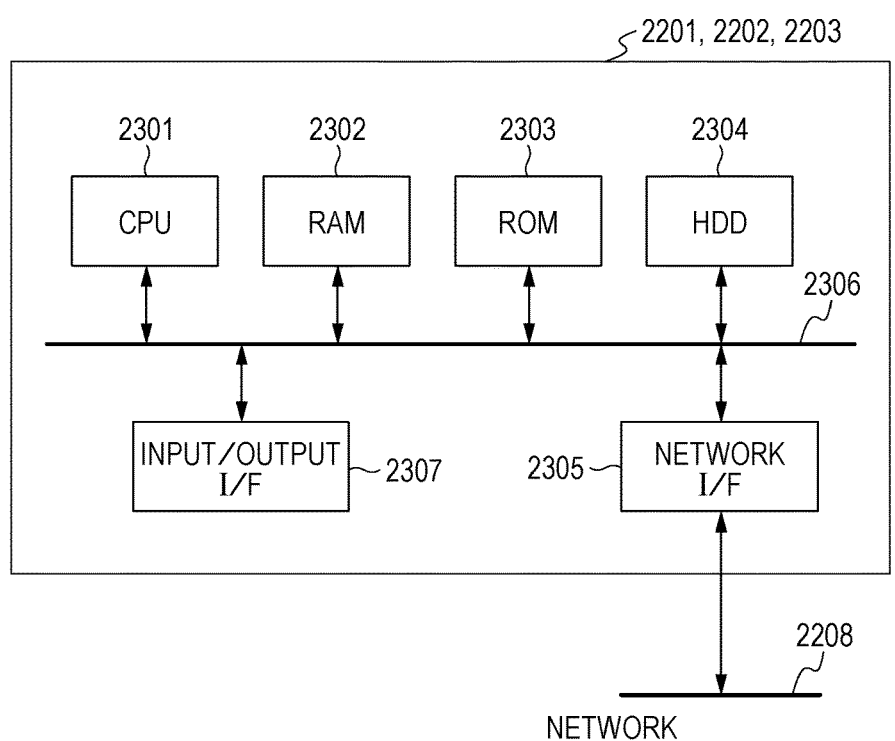
FIG. 23 is a hardware configuration diagram of a Web Intents client, a UA, and a Web Intents service in the third embodiment.

FIG. 23 is a diagram illustrating the hardware configuration of the Web Intents client 2201, the UA 2202, and the Web Intents service 2203 according to an embodiment of the present invention. Since the details of the configurations have been described in the first embodiment, the descriptions thereof will be omitted.

Figure 24:
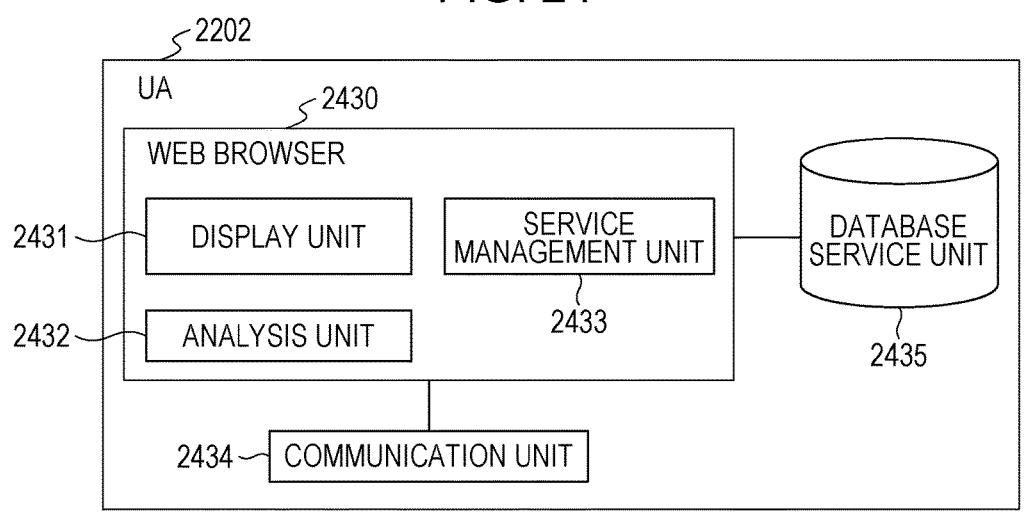
FIG. 24 is a software configuration diagram in the third embodiment.

FIG. 24 is a diagram illustrating an example of the software (processing units) configuration of the UA 2202. Since the details of the processing units have been described in the first embodiment, the descriptions thereof will be omitted.

FIG. 25A is an example of a registered-Intents-service table 2500 held by the UA 2202 to manage Web Intents services registered in the UA 2202. This table is stored in an HDD 2304 within the Web Intents service 2203 and controlled by a database service unit 2435. A Service ID 2501, an action 2502, a type 2503, an href 2504, a title 2505, and a disposition 2506 are the same as those described in the first embodiment and, hence, the descriptions thereof will be omitted.

FIG. 25B illustrates an exclusive action table 2510 for determining whether or not exclusive display is to be performed for each action. This table is stored in the HDD 2304 within the UA 2202 and controlled by the database service unit 2435. Reference symbol 2512 denotes an exclusive flag which defines whether or not exclusive display is to be performed for each action 2511. This allows the UA 2202 to perform exclusive control for display of the Web Intents service 2203 in a browser 2430.

Figure 26:
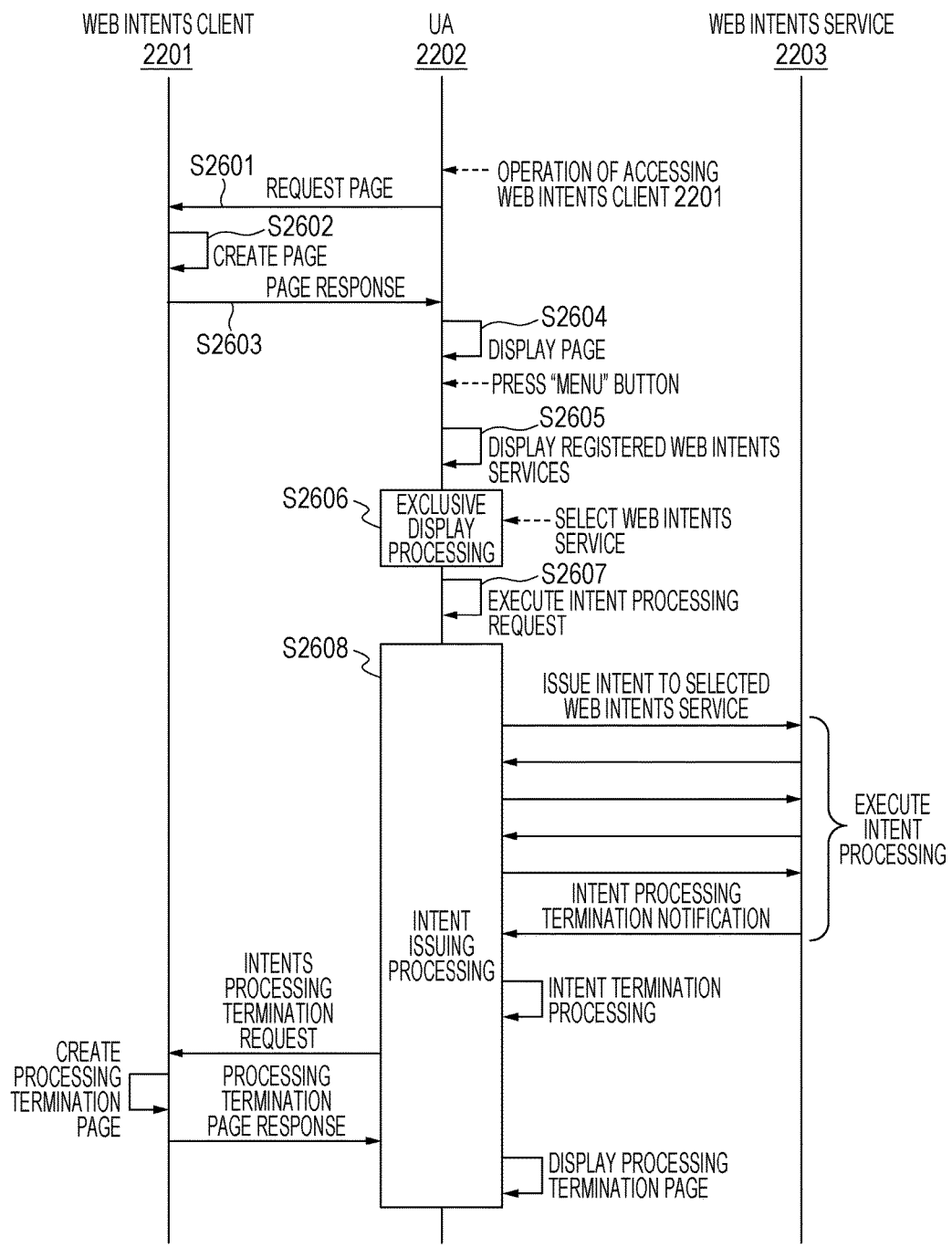
FIG. 26 is a sequence diagram of exclusive display processing of a UA in the third embodiment.

FIG. 26 is a sequence diagram illustrating processing in which the UA 2202 accesses the Web Intents client 2201 and performs exclusive control of display of the Web Intents service 2203 in accordance with the action 2511. Similarly to the first embodiment, here, processing performed when the UA 2202 accessed the Web Intents client 2201 in a state where the Web Intents services 2203 have already been registered in the UA 2202 will be described.

Figures 27A, 27B:
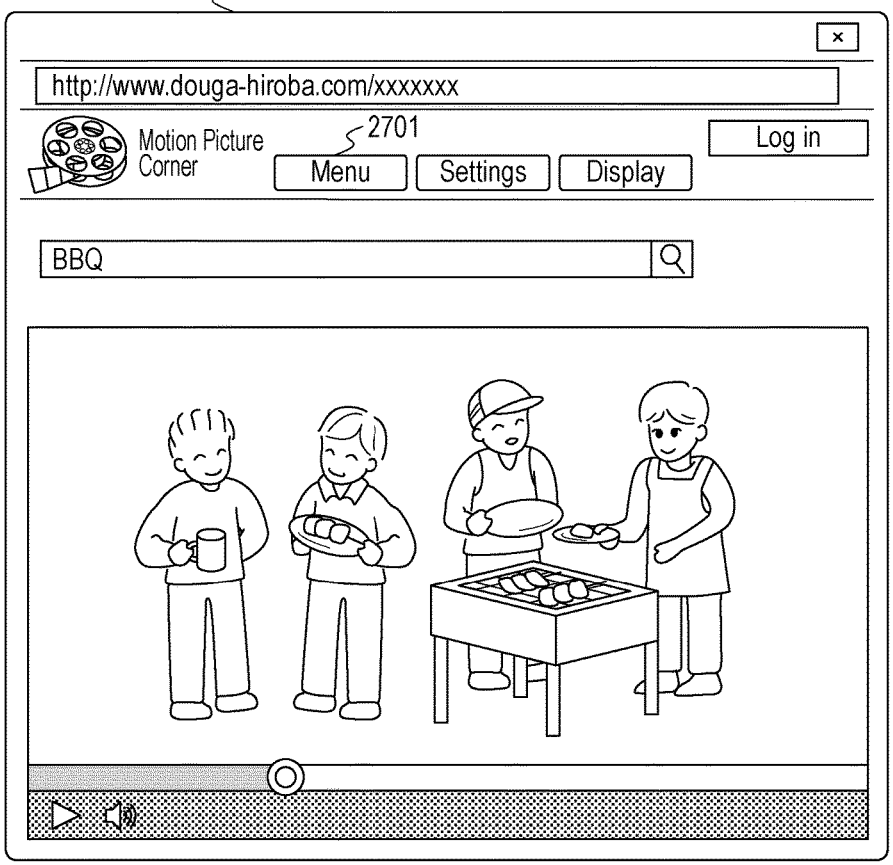
FIG. 27A illustrates ECMA Script code in an HTML document created by a Web Intents client in the third embodiment.
FIG. 27B illustrates an example of a screen of a Web Intents client displayed by a UA in the third embodiment.
Figure 28:
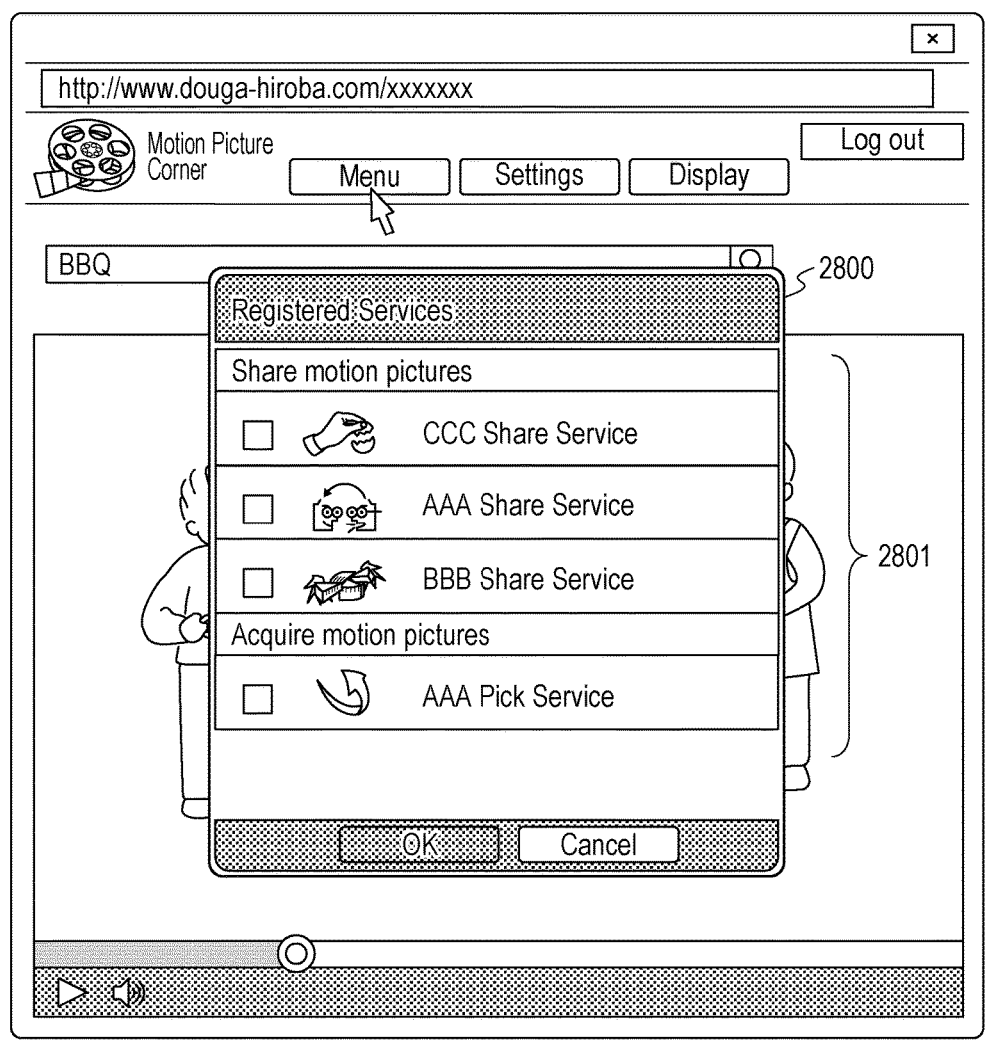
FIG. 28 illustrates an example of a screen at the time when a UA pressed a menu button in the third embodiment.

Processing of steps S2601 to S2605 is the same as that of steps S901 to S905 (FIG. 9) described in the first embodiment and, hence, the description thereof will be omitted. An example of a screen displayed in step S2604 will be described with reference to FIGS. 27A and 27B. FIG. 27A illustrates an example of ECMA Script code which is created by the Web Intents client 2201 in step S2602, and which is written in an HTML document displayed by the UA 2202 in step S2604. The ECMA Script code shows that when a button having an ID "menu" within the HTML document is clicked, a specified anonymous function is called. The anonymous function first creates a new Intent object and calls the startActivity ( ) function with this object as an argument. When this function is executed, the UA 2202 selects Web Intents services having a type identical to the type of the specified action of the Intents, from among the Web Intents services 2203 registered in the UA 2202, and displays them, thereby asking a user to make selection. FIG. 27B illustrates an example of a screen displayed by the UA 2202 in step S2604. A screen 2700 is displayed by a display unit 2431 of the browser 2430. Reference symbol 2701 denotes a button for calling the Web Intents service 2203. Here, it is assumed that the ID "menu" in the HTML document is assigned to the button 2701. The browser 2430, upon detection of the pressing of the button 2701, executes the ECMA Script code illustrated in FIG. 27A. In the screen 2700 displayed in step S2604, when the "menu" button is pressed by a user, the UA 2202 displays the target services in step S2605, with reference to the registered Web Intents service table 2500. FIG. 28 illustrates an example of a screen displayed by the UA 2202 in the browser 2430 at this time. Reference symbol 2800 denotes a pop-up screen displayed by the UA 2202 as a result of the "menu" button 2701 being pressed. Reference symbol 2801 denotes a list of the Web Intents services 2203 which became the targets to be displayed in step S2605.

Processing for exclusive control of display of the Web Intents service 2203 in step S2606 will be described with reference to a flowchart illustrated in FIG. 29.

Figure 29:
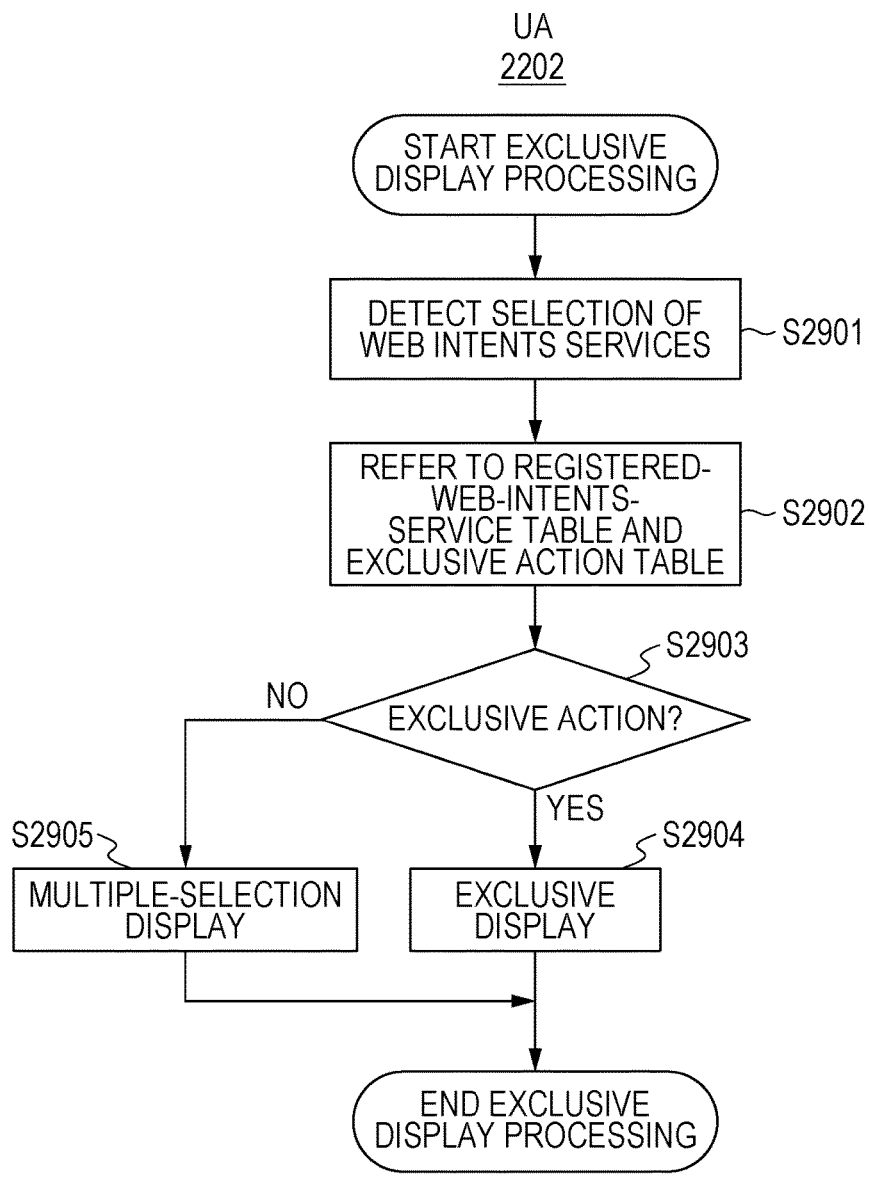
FIG. 29 is a flowchart of exclusive display processing of a UA in the third embodiment.
Figure 30:
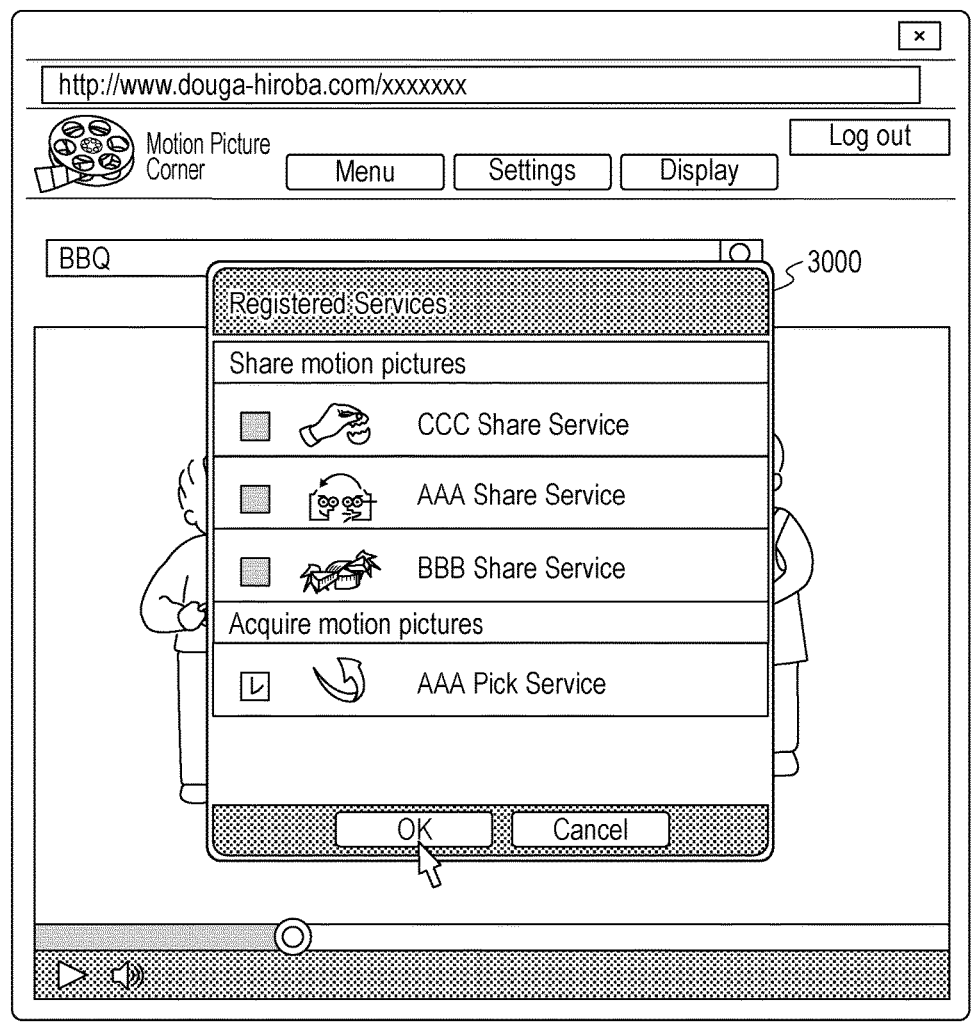
FIG. 30 illustrates an example of an exclusive display screen of a UA in the third embodiment.

FIG. 29 is a flowchart of processing for exclusive control performed by the UA 2202 at the time of display in accordance with the action of the Web Intents service 2203 selected by a user. In step S2901, the UA 2202 detects that the Web Intents service 2203 has been pressed by the user in the screen 2800. In step S2902, the UA 2202 refers to the registered Web Intents service table 2500 and the exclusive action table 2510. In step S2903, the UA 2202 determines whether or not exclusive control is necessary during display on the basis of the two tables. When it is determined in step S2903 that exclusive control is necessary, the UA 2202 performs exclusive display in step S2904. For example, when it is assumed that "AAA PickService" has been selected, since the exclusive flag is "1" in the case where the action 2511 is "pick", as is seen from the exclusive action table 2510, exclusive display is performed. FIG. 30 illustrates an example of a displayed screen at this time. A screen 3000 shows that as a result of "AAA Pick Service" being selected, services of other actions 2502 cannot be selected. When it is determined in step S2903 that exclusive control is not required, the UA 2202 performs multiple-selection display in step S2905 as described in the first embodiment.

In the present embodiment, a method of determining whether or not exclusive display is performed by the UA 2202 in accordance with the action 2511 of the Web Intents service 2203 has been described. Regarding the display control of the UA 2202, the state of the UA 2202 may be taken into consideration as a display control condition. An example may be a case in which in an environment where the UA 2202 cannot be connected to the Internet, only the Web Intents services 2203 within the UA 2202 are displayed. In the present embodiment, the configurations of the servers and devices, the configurations of the software modules, the processing flow of using a plurality of services at the same time have been described. However, these are examples and the present embodiment is not limited to these.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2013-156716, filed Jul. 29, 2013, which is hereby incorporated by reference herein in its entirety.

What is claimed is:

1. An agent terminal executing an operating system (OS) in which information pieces respectively indicating a plurality of services are registered in advance, comprising:
    a memory storing instructions for an agent function of cooperating with a service; and
    a processor which can execute the instructions causing the agent terminal to:
    display a web site securely provided using Hypertext Transfer Protocol Secure (HTTPS) by a server, wherein Hypertext Markup Language (HTML) data corresponding to the web site includes descriptions related to a first function executed in response to an operation to a button displayed on the web site and, if the first function is executed, a second function defined in the first function using a navigator interface is further executed to display a selection screen for selecting one or more services from the plurality of services corresponding to the information registered in the OS;
    display, by executing the second function according to a user operation to the button displayed on the web site, the selection screen;
    issue, according to selection of more than one service via the selection screen, a request for processing data related to the web site to each service provider corresponding to the selected more than one service, wherein the descriptions related to the first function included in the HTML data corresponding to the web site includes information of the data related to the web site;
    receive a notification related to each of the selected more than one service from the each service provider; and
    display a screen indicating processing results of the selected more than one service based on the received notifications,
    wherein the plurality of services corresponding to the information registered in the OS include services of applications which have been installed in the agent terminal.

2. The agent terminal according to claim 1, wherein, in the HTML data, an action type corresponding to the button displayed on the web site is set as a share.

3. The agent terminal according to claim 2, wherein the instructions further cause the agent terminal to extract services which the action type match from the plurality of services corresponding to the information registered in the OS, and the selection screen includes the extracted services.

4. The agent terminal according to claim 1, wherein the instructions further cause the agent terminal to acquire the data related to the web site from the server according to the information of the data related to the web site in the descriptions related to the first function.

5. A method of controlling an agent terminal executing an operating system (OS) in which information pieces respectively indicating a plurality of services are registered in advance, comprising:
    displaying a web site securely provided using Hypertext Transfer Protocol Secure (HTTPS) by a server, wherein Hypertext Markup Language (HTML) data corresponding to the web site includes descriptions related to a first function executed in response to an operation to a button displayed on the web site and, if the first function is executed, a second function defined in the first function using a navigator interface is further executed to display a selection screen for selecting one or more services from the plurality of services corresponding to the information registered in the OS;
    displaying, by executing the second function according to a user operation to the button displayed on the web site, the selection screen;
    issuing, via the processor, according to selection of more than one service via the selection screen, a request for processing data related to the web site to each service provider corresponding to the selected more than one service, wherein the descriptions related to the first function included in the HTML data corresponding to the web site includes information of the data related to the web site;

receiving, via the processor, a notification related to each of the selected more than one service from the each service provider; and displaying a screen indicating processing results of the selected more than one service based on the received notifications, wherein the plurality of services corresponding to the information registered in the OS include services of applications which have been installed in the agent terminal.

6. A non-transitory computer-readable storage medium for storing instructions that cause a processor of an agent terminal executing an operating system (OS) in which information pieces respectively indicating a plurality of services are registered in advance to perform a method, the method comprising:

displaying a web site securely provided using Hypertext Transfer Protocol Secure (HTTPS) by a server, wherein Hypertext Markup Language (HTML) data corresponding to the web site includes descriptions related to a first function executed in response to an operation to a button displayed on the web site and, if the first function is executed, a second function defined in the first function using a navigator interface is further executed to display a selection screen for selecting one or more services from the plurality of services corresponding to the information registered in the OS;

displaying, by executing the second function according to a user operation to the button displayed on the web site, the selection screen;

issuing, via the processor, according to selection of more than one service via the selection screen, a request for processing data related to the web site to each service provider corresponding to the selected more than one service, wherein the descriptions related to the first function included in the HTML data corresponding to the web site includes information of the data related to the web site;

receiving, via the processor, a notification related to each of the selected more than one service from the each service provider; and displaying a screen indicating processing results of the selected more than one service based on the received notifications, wherein the plurality of services corresponding to the information registered in the OS include services of applications which have been installed in the agent terminal.

* * * * *